(12) United States Patent
Chawla et al.

(10) Patent No.: US 11,314,580 B2
(45) Date of Patent: Apr. 26, 2022

(54) GENERATING RECOMMENDATIONS FOR INITIATING RECOVERY OF A FAULT DOMAIN REPRESENTING LOGICAL ADDRESS SPACE OF A STORAGE SYSTEM

(71) Applicant: EMC IP Holding Company LLC, Hopkinton, MA (US)

(72) Inventors: Rohit K. Chawla, Scotch Plains, NJ (US); Dixitkumar Vishnubhai Patel, Monroe, NJ (US)

(73) Assignee: EMC IP Holding Company LLC, Hopkinton, MA (US)

( * ) Notice: Subject to any disclaimer, the term of this patent is extended or adjusted under 35 U.S.C. 154(b) by 243 days.

(21) Appl. No.: 16/862,740

(22) Filed: Apr. 30, 2020

(65) Prior Publication Data

US 2021/0342215 A1 Nov. 4, 2021

(51) Int. Cl.
*G06F 11/07* (2006.01)
*G06F 12/1009* (2016.01)

(52) U.S. Cl.
CPC ........ *G06F 11/0793* (2013.01); *G06F 11/079* (2013.01); *G06F 11/0727* (2013.01); *G06F 11/0751* (2013.01); *G06F 12/1009* (2013.01); *G06F 2212/1044* (2013.01)

(58) Field of Classification Search
CPC .............. G06F 11/0793; G06F 11/079; G06F 11/0727; G06F 11/0751; G06F 11/1016; G06F 11/3471
See application file for complete search history.

(56) References Cited

U.S. PATENT DOCUMENTS

| | | | |
|---|---|---|---|
| 8,954,383 B1 | 2/2015 | Vempati et al. | |
| 9,003,227 B1 | 4/2015 | Patel et al. | |
| 9,104,675 B1 | 8/2015 | Clark et al. | |
| 9,569,306 B1 * | 2/2017 | Camp | G06F 11/1012 |
| 9,778,996 B1 | 10/2017 | Bono et al. | |
| 10,810,076 B1 * | 10/2020 | Spiro | G06F 3/04842 |
| 11,061,770 B1 * | 7/2021 | Patel | G06F 3/0619 |
| 2015/0234706 A1 * | 8/2015 | Alrod | G11C 29/52 |
| | | | 714/704 |

(Continued)

OTHER PUBLICATIONS

U.S. Appl. No. 16/260,660, filed Jan. 29, 2019, and entitled "System and Method for Aggregating Metadata Changes in a Storage System.".

*Primary Examiner* — Yolanda L Wilson
(74) *Attorney, Agent, or Firm* — Ryan, Mason & Lewis, LLP

(57) ABSTRACT

An apparatus comprises a processing device configured to identify faults associated with a logical address space in a fault domain of a storage system, the faults specifying fault reason codes and metadata types for logical pages in the logical address space associated with the faults. The processing device is also configured to determine a fault summary characterizing impact of the faults in the fault domain of the storage system, the fault summary being based on aggregating fault scores assigned to the fault reason codes and the metadata types specified in the faults. The processing device is further configured to generate a recommendation on whether to initiate recovery of the fault domain of the storage system based on the fault summary, and to initiate recovery of the fault domain of the storage system based on the generated recommendation.

20 Claims, 21 Drawing Sheets

(56) References Cited

U.S. PATENT DOCUMENTS

| | | | |
|---|---|---|---|
| 2016/0110249 A1* | 4/2016 | Orme | G06F 11/1016 |
| | | | 714/6.24 |
| 2017/0132083 A1* | 5/2017 | Aslot | G06F 11/079 |
| 2017/0315879 A1* | 11/2017 | Park | G06F 11/0727 |
| 2019/0114217 A1* | 4/2019 | Pletka | G06F 11/073 |

\* cited by examiner

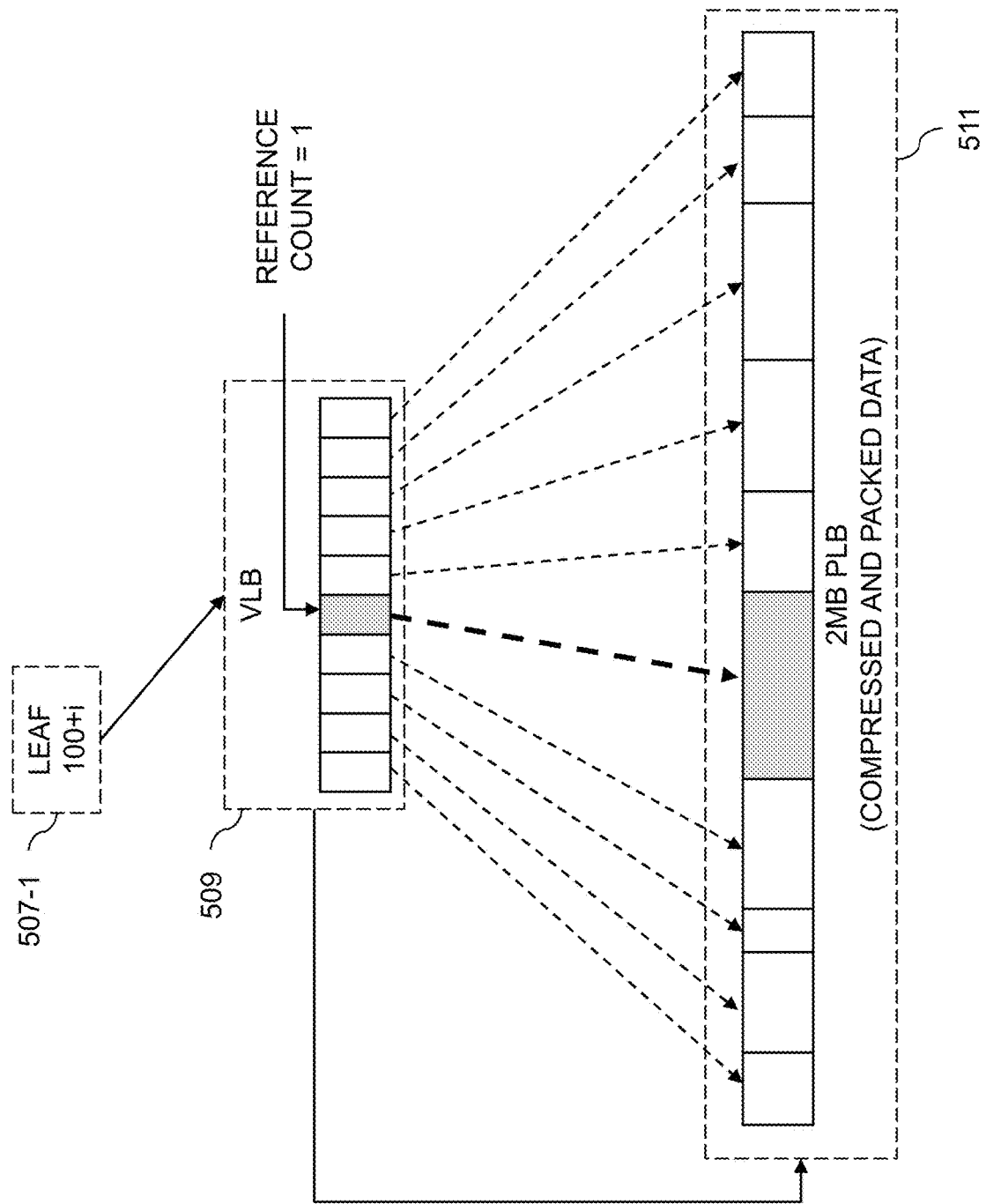

| FAULT SUMMARY PARAMETER | VALUE |
|---|---|
| NUMBER OF UNIQUE FAULTS | 5 |
| NUMBER OF VOLUMES IMPACTED | 2 |
| NUMBER OF FAMILIES IMPACTED | 1 |
| TOTAL DATA UNAVAILABLE | 1049602MB |
| DATA UNAVAILABLE PER-VOLUME | • V1000 – 524288MB<br>• V2000 – 524288MB |
| DATA UNAVAILABLE PER-FAMILY | • F100 – 1049602MB |
| TOTAL SPACE UNAVAILABLE | 1049604MB |
| TOTAL DATA RECOVERABLE | 1049600MB |
| DATA RECOVERABLE PER-FAMILY | 1049600MB |
| AVERAGE FAULT META TYPE SCORE | 8.33 (MIN-MAX = 1-13) |
| STANDARD DEVIATION OF FAULT META TYPE SCORE | 5.27 |
| AVERAGE FAULT REASON SCORE | 3 (MIN-MAX = 1-6) |
| STANDARD DEVIATION OF FAULT REASON SCORE | 2.45 |

GENERATING RECOMMENDATIONS FOR INITIATING RECOVERY OF A FAULT DOMAIN REPRESENTING LOGICAL ADDRESS SPACE OF A STORAGE SYSTEM

FIELD

The field relates generally to information processing, and more particularly to storage in information processing systems.

BACKGROUND

Storage arrays and other types of storage systems are often shared by multiple host devices over a network. Applications running on the host devices each include one or more processes that perform the application functionality. Such processes issue input-output (IO) operation requests for delivery to the storage systems. Storage controllers of the storage systems service such requests for IO operations. Some storage systems use a logical address space, where logical page addresses in the logical address space map to physical page addresses on storage devices of the storage systems. The use of a logical address space facilitates various functionality, including implementation of deduplication in order to ensure that the same data is not repeatedly stored in a duplicative manner that consumes excessive storage capacity.

SUMMARY

Illustrative embodiments of the present disclosure provide techniques for generating recommendations for initiating recovery of a fault domain representing at least a portion of a logical address space of a storage system.

In one embodiment, an apparatus comprises at least one processing device comprising a processor coupled to a memory. The at least one processing device is configured to perform the step of identifying a plurality of faults associated with at least a portion of a logical address space in a fault domain of a storage system, the plurality of faults specifying (i) fault reason codes and (ii) metadata types for logical pages in the logical address space associated with the plurality of faults. The at least one processing device is also configured to perform the step of determining a fault summary characterizing impact of the plurality of faults in the fault domain of the storage system, the fault summary being based at least in part on aggregating fault scores assigned to the fault reason codes and the metadata types specified in the plurality of faults. The at least one processing device is further configured to perform the steps of generating a recommendation on whether to initiate recovery of the fault domain of the storage system based at least in part on the fault summary, and initiating recovery of the fault domain of the storage system based at least in part on the generated recommendation.

These and other illustrative embodiments include, without limitation, methods, apparatus, networks, systems and processor-readable storage media.

BRIEF DESCRIPTION OF THE DRAWINGS

FIGS. 5A and 5B illustrate deduplication using a virtual large block of the tree structure of FIGS. 4A and 4B in an illustrative embodiment.

FIGS. 9A-9D show tables of fault information utilized for determining when to initiate recovery of a storage system in an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
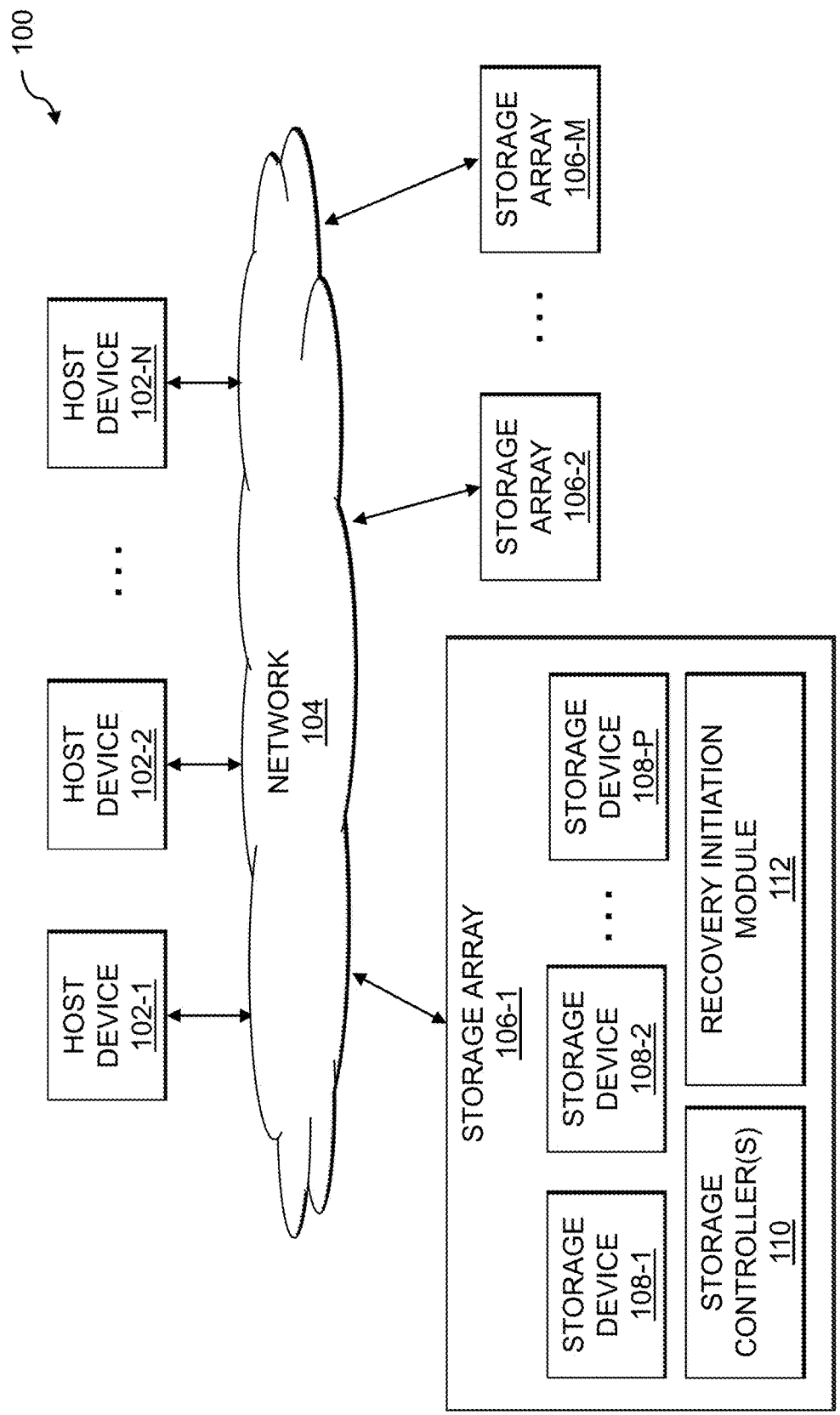
FIG. 1 is a block diagram of an information processing system including a storage array configured to generate recommendations for initiating recovery of a fault domain representing at least a portion of a logical address space of the storage array in an illustrative embodiment.

FIG. 1 shows an information processing system 100 configured in accordance with an illustrative embodiment. The information processing system 100 comprises one or more host devices 102-1, 102-2, . . . 102-N (collectively, host devices 102) that communicate over a network 104 with one or more storage arrays 106-1, 106-2, . . . 106-M (collectively, storage arrays 106). The network 104 may comprise a storage area network (SAN).

The storage array 106-1, as shown in FIG. 1, comprises a plurality of storage devices 108-1, 108-2, . . . 108-P (collectively, storage devices 108) each storing data utilized by one or more applications running on the host devices 102. The storage devices 108 are illustratively arranged in one or more storage pools. The storage array 106-1 also comprises one or more storage controllers 110 that facilitate IO processing for the storage devices 108. The storage array 106-1 and its associated storage devices 108 are an example of what is more generally referred to herein as a "storage system." This storage system in the present embodiment is shared by the host devices 102, and is therefore also referred to herein as a "shared storage system." In embodiments where there is only a single host device 102, the host device 102 may be configured to have exclusive use of the storage system.

The host devices 102 illustratively comprise respective computers, servers or other types of processing devices capable of communicating with the storage arrays 106 via the network 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102.

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The storage devices 108 of the storage array 106-1 may implement logical units (LUNs) configured to store objects for users associated with the host devices 102. These objects can comprise files, blocks or other types of objects. The host devices 102 interact with the storage array 106-1 utilizing read and write commands as well as other types of commands that are transmitted over the network 104. Such commands in some embodiments more particularly comprise Small Computer System Interface (SCSI) commands, although other types of commands can be used in other embodiments. A given IO operation as that term is broadly used herein illustratively comprises one or more such commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in the storage array 106-1 to include different portions of one or more physical storage devices. Storage devices 108 may therefore be viewed as comprising respective LUNs or other logical storage volumes.

The host devices 102 and storage arrays 106 in the FIG. 1 embodiment are assumed to be implemented using at least one processing platform, with each processing platform comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage arrays 106 may be implemented on respective distinct processing platforms, although numerous other arrangements are possible. For example, in some embodiments at least portions of the host devices 102 and the storage arrays 106 are implemented on the same processing platform. One or more of the storage arrays 106 can therefore be implemented at least in part within at least one processing platform that implements at least a subset of the host devices 102.

The network 104 may be implemented using multiple networks of different types to interconnect storage system components. For example, the network 104 may comprise a SAN that is a portion of a global computer network such as the Internet, although other types of networks can be part of the SAN, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Although in some embodiments certain commands used by the host devices 102 to communicate with the storage arrays 106 illustratively comprise SCSI commands, other types of commands and command formats can be used in other embodiments. For example, some embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

The storage array 106-1 in the present embodiment is assumed to comprise a persistent memory that is implemented using a flash memory or other type of non-volatile memory of the storage array 106-1. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 108 of the storage array 106-1, although in other embodiments the persistent memory may be implemented as a designated portion or portions of one or more of the storage devices 108. For example, in some embodiments the storage devices 108 may comprise flash-based storage devices, as in embodiments involving all-flash storage arrays, or may be implemented in whole or in part using other types of non-volatile memory.

The storage array 106-1 in the present embodiment may comprise additional components not explicitly shown in the figure, such as a response time control module and IO operation priority queues, illustratively configured to make use of the above-described persistent memory. For example, the response time control module may be used to implement storage array-based adjustments in response time for particular IO operations based at least in part on service level objective (SLO) information stored by the storage array 106-1 in its persistent memory. The response time control module is assumed to operate in conjunction with the above-noted IO operation priority queues.

The storage array 106-1 illustratively utilizes its IO operation priority queues to provide different levels of performance for IO operations. For example, the IO operation priority queues may have respective different priority levels. The storage array 106-1 may be configured to provide different priority levels for different ones of the IO operations by assigning different ones of the IO operations to different ones of the IO operation priority queues. The IO operation priority queues are illustratively associated with respective SLOs for processing of IO operations in the storage array 106-1.

As mentioned above, communications between the host devices 102 and the storage arrays 106 may utilize PCIe connections or other types of connections implemented over one or more networks. For example, illustrative embodiments can use interfaces such as Internet SCSI (iSCSI), Serial Attached SCSI (SAS) and Serial ATA (SATA). Numerous other interfaces and associated communication protocols can be used in other embodiments.

The storage arrays 106 in some embodiments may be implemented as part of a cloud-based system.

The storage devices 108 of the storage array 106-1 can be implemented using solid state drives (SSDs). Such SSDs are implemented using non-volatile memory (NVM) devices such as flash memory. Other types of NVM devices that can be used to implement at least a portion of the storage devices 108 include non-volatile random access memory (NVRAM), phase-change RAM (PC-RAM) and magnetic RAM (MRAM). These and various combinations of multiple different types of NVM devices or other storage devices may also be used. For example, hard disk drives (HDDs) can be used in combination with or in place of SSDs or other types of NVM devices. Accordingly, numerous other types of electronic or magnetic media can be used in implementing at least a subset of the storage devices 108.

The storage arrays 106 may additionally or alternatively be configured to implement multiple distinct storage tiers of a multi-tier storage system. By way of example, a given multi-tier storage system may comprise a fast tier or performance tier implemented using flash storage devices or other types of SSDs, and a capacity tier implemented using HDDs, possibly with one or more such tiers being server based. A wide variety of other types of storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, SSDs, HDDs, flash drives, hybrid drives or other types of storage products and devices, or portions thereof, and illustratively include logical storage devices such as LUNs.

As another example, the storage arrays 106 may be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

In some embodiments, a storage system comprises first and second storage arrays arranged in an active-active configuration. For example, such an arrangement can be used to ensure that data stored in one of the storage arrays is replicated to the other one of the storage arrays utilizing a synchronous replication process. Such data replication across the multiple storage arrays can be used to facilitate failure recovery in the system 100. One of the storage arrays may therefore operate as a production storage array relative to the other storage array which operates as a backup or recovery storage array.

It is to be appreciated, however, that embodiments disclosed herein are not limited to active-active configurations or any other particular storage system arrangements. Accordingly, illustrative embodiments herein can be configured using a wide variety of other arrangements, including, by way of example, active-passive arrangements, active-active Asymmetric Logical Unit Access (ALUA) arrangements, and other types of ALUA arrangements.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and one or more associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage arrays 106.

Numerous other distributed implementations of the host devices 102 and/or the storage array 106 are possible. Accordingly, the storage arrays 106 can also be implemented in a distributed manner across multiple data centers.

Additional examples of processing platforms utilized to implement portions of the system 100 in illustrative embodiments will be described in more detail below in conjunction with FIGS. 12 and 13.

The storage array 106-1 implements a recovery initiation module 112. Although not explicitly shown in FIG. 1 for clarity of illustration, it is assumed in some embodiments that other ones of the storage arrays 106-2 through 106-M implement respective additional instances of a recovery initiation module, as well as respective sets of storage devices and storage controllers in a manner similar to that described herein with respect to storage array 106-1. Further, although shown in FIG. 1 as being external to the storage controllers 110 of storage array 106-1, in other embodiments the recovery initiation module 112 may be implemented at least partially within one or more of the storage controllers 110. For example, at least one of the storage controllers 110 may be implemented as a virtual storage controller running on an embedded hypervisor of the storage array 106-1. The recovery initiation module 112 may be part of such a virtual storage controller, or may be run separate from the virtual storage controller on such an embedded hypervisor. Various other arrangements are possible, including where at least a portion of the functionality of the recovery initiation module 112 is implemented external to the storage array 106-1 (e.g., on one or more of the host devices 102, on a separate server, on a cloud computing infrastructure, etc.).

The recovery initiation module 112 is configured to identify a plurality of faults associated with at least a portion of a logical address space in a fault domain of the storage array 106-1 (e.g., which may include the entire logical address space of the storage array 106-1, or a storage cluster that includes the storage array 106-1 and one or more other ones of the storage arrays 106-2 through 106-M). Each of the plurality of faults specifies a fault reason code and a metadata type for a logical page in the logical address space that is a source of that fault. The recovery initiation module 112 is also configured to determine a fault summary that characterizes impact of the plurality faults in the fault domain of the storage system. The fault summary may be based, at least in part, on aggregating fault scores associated to the fault reasons codes and the metadata types specified in the plurality of faults.

The recovery initiation module 112 is further configured to generate a recommendation on whether to initiate recovery of the fault domain of the storage system based at least in part on the fault summary. In some embodiments, it is assumed that running the recovery of the fault domain will result in at least a portion of the storage array 106-1 being taken offline or otherwise made unavailable (e.g., to the host devices 102) while the recovery is in progress. The generating recommendation as to whether to initiate the recovery, in some embodiments, is provided to a storage administrator, service personnel or other authorized user to confirm whether or not to run the recovery. This may be done where the generated recommendation has an associated urgency that is below some threshold, so as to solicit user input to determine when to initiate the recovery. Providing the generated recommendation to the user may also include providing the fault summary or a portion thereof (e.g., one or more visualizations of the fault summary) so as to enable the user to make an informed decision as to whether and when to initiate the recovery. The recovery initiation module 112 is further configured to initiate recovery of the fault domain of the storage system based at least in part on the generated recommendation. The recovery may be initiated automatically in response to the generated recommendation (e.g., such as in cases where the generated recommendation has an associated urgency that is above some threshold), in response to user input, combinations thereof, etc.

At least portions of the functionality of the recovery initiation module 112 may be implemented at least in part in the form of software that is stored in memory and executed by a processor.

It is to be understood that the particular set of elements shown in FIG. 1 for generating recommendations for initiating recovery of a fault domain representing at least a portion of a logical address space of the storage array 106-1 is presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

An exemplary process for generating recommendations for initiating recovery of a fault domain representing at least a portion of a logical address space of a storage system will now be described in more detail with reference to the flow diagram of FIG. 2. It is to be understood that this particular process is only an example, and that additional or alternative processes for generating recommendations for initiating recovery of a fault domain representing at least a portion of a logical address space of a storage system may be used in other embodiments.

In this embodiment, the process includes steps 200 through 206. These steps are assumed to be performed by the storage array 106-1 utilizing the recovery initiation module 112. The process begins with step 200, identifying a plurality of faults associated with at least a portion of a logical address space in a fault domain of a storage system. The fault domain may comprise all of the logical address space of the storage system (e.g., the storage system may have a single fault domain).

Each of the plurality of faults specifies (i) a fault reason code and (ii) a metadata type for logical pages in the logical address space associated with that fault. In some embodiments, a given one of the plurality of faults specifies: a given metadata type for a given logical page in the logical address space that is a source of the given fault; a given fault reason code; a given fault scope characterizing at least one of potential data loss and potential logical address space loss in the storage system resulting from the given fault; a given snapshot group associated with the given logical page; and one or more storage volumes associated with the given logical page.

The logical address space may be organized as a B-tree comprising a plurality of levels (e.g., as described in further detail below in conjunction with FIGS. 4A and 4B). The plurality of levels may include: a leaf logical page level comprising a plurality of leaf pages; a middle page level comprising a plurality of middle pages associated with respective subsets of the plurality of leaf pages in the leaf page level; a top page level comprising one or more top pages associated with respective subsets of the plurality of middle pages in the middle page level; and a root page level comprising one or more root pages associated with respective subsets of the plurality of top pages. A given one of the one or more top pages represents an n*m sized portion of the logical address space that references n of the plurality of middle pages in the middle page level, a given one of the n middle pages represents an m sized portion of the logical address space and references n of the plurality of leaf pages in the leaf page level, and a given one of then leaf pages represents an m/n sized portion of the logical address space. In some embodiments, n is 512 and m is one gigabyte.

The logical address space may further include a virtual block level and a physical block level. The plurality of leaf pages in the leaf logical page level may comprise pointers to virtual block addresses associated with entries in a plurality of virtual blocks in the virtual block level of the logical address space, and the virtual block addresses may comprise pointers to physical block addresses in a plurality of physical blocks in the physical block level of the logical address space.

Fault scores assigned to the metadata types may be based on a hierarchy of the plurality of levels in the B-tree (e.g., with the root level being assigned a highest score, the top page level being assigned a next highest score, and so one for the middle page level, leaf page level, virtual block level and physical block level).

Figure 2:
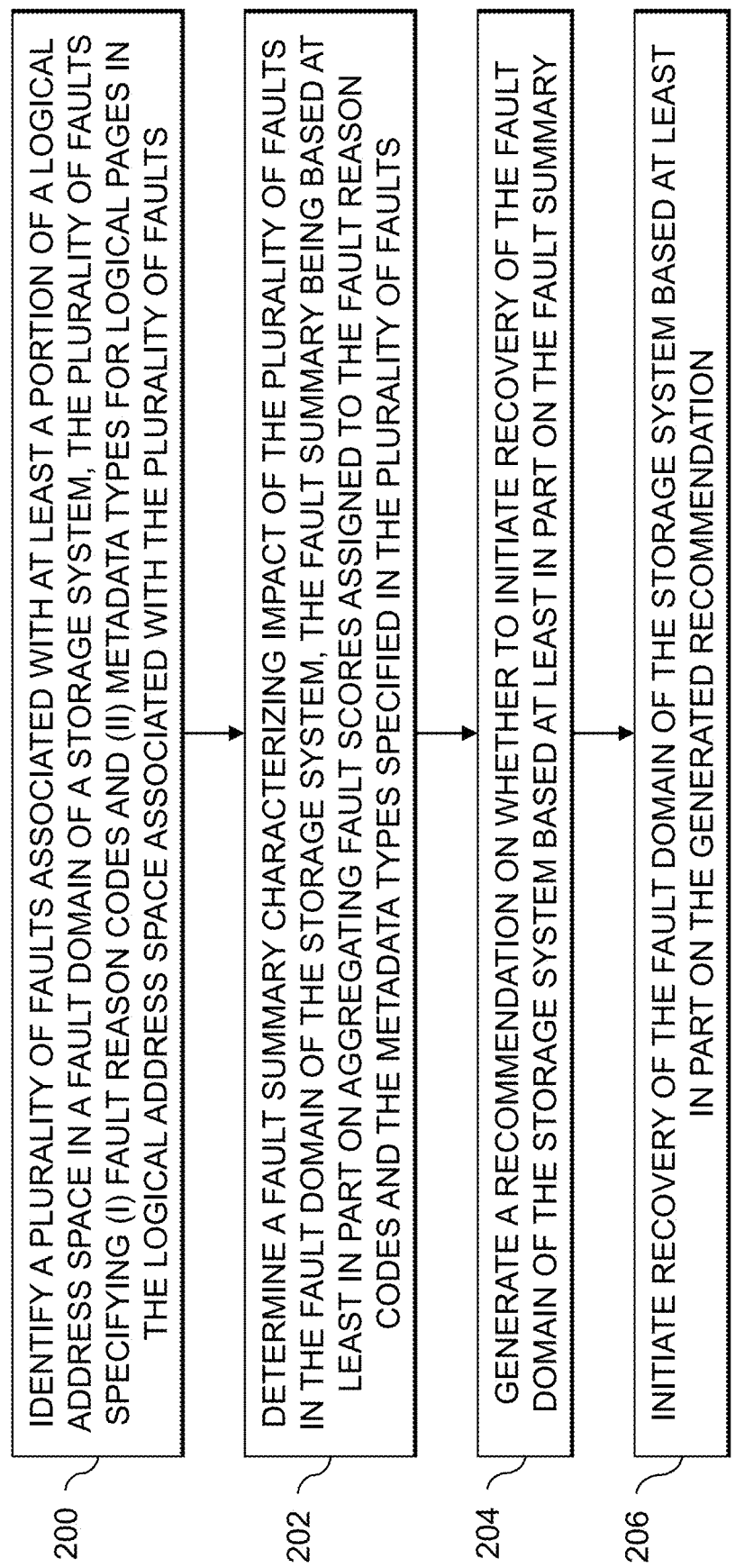
FIG. 2 is a flow diagram of an exemplary process for generating recommendations for initiating recovery of a fault domain representing at least a portion of a logical address space of a storage system in an illustrative embodiment.

The FIG. 2 process continues with step 202, determining a fault summary characterizing impact of the plurality of faults in the fault domain of the storage system. The fault summary may be based at least in part on aggregating fault scores assigned to the fault reason codes and the metadata types specified in the plurality of faults. In step 204, a recommendation on whether to initiate recovery of the fault domain of the storage system is generated based at least in part on the fault summary. Recovery of the fault domain of the storage system is initiated in step 206 based at least in part on the generated recommendation.

The fault summary may comprise a set of fault summary parameters for the plurality of faults. In some embodiments, the set of fault summary parameters comprises: at least one of a number of unique faults in the plurality of faults, a number of storage volumes impacted by the plurality of faults, and a number of snapshot groups impacted by the plurality of faults; at least one of a total amount of data made unavailable in the storage system as a result of the plurality of faults, a total amount of logical address space made unavailable as a result of the plurality of faults, per-storage volume amounts of data made unavailable in the storage system as a result of the plurality of faults, and per-snapshot group amounts of data made unavailable in the storage system as a result of the plurality of faults; and at least one of a total amount of recoverable data in the storage system, per-storage volume amounts of recoverable data in the storage system, and per-snapshot group amounts of recoverable data in the storage system. In other embodiments, the set of fault summary parameters also or alternatively comprises a frequency distribution of fault scores for the metadata types specified in the plurality of faults and a frequency distribution of fault scores for the fault reason codes specified in the plurality of faults. In some other embodiments, the set of fault summary parameters further or alternatively comprises: an average fault score for the metadata types specified in the plurality of faults; a standard deviation of the average fault score for the metadata types specified in the plurality of faults; an average fault score for the fault reason codes specified in the plurality of faults; and a standard deviation of the average fault score for the fault reason codes specified in the plurality of faults.

The fault summary may comprise at least one visualization of the set of fault summary parameters. For example, the at least one visualization of the fault summary may comprise a plot that includes data points for each of at least a subset of the plurality of faults, a given data point for a given fault representing the fault score for the metadata type specified in the given fault on a first axis and the fault score for the fault reason code specified in the given fault on a second axis. The plot may also include an additional data point representing the average fault score for the metadata types specified in the plurality of faults on the first axis and the average fault score for the fault reason codes specified in the plurality of faults on the second axis. The plot may further include various visual indicators, such as a first visual indicator of the standard deviation of the average fault score for the metadata types specified in the plurality of faults extending from the additional data point along the first axis, a second visual indicator of the standard deviation of the average fault score for the fault reason codes specified in the plurality of faults extending from the additional data point along the second axis, and a third visual indicator representing a radius of fault scores in the first axis and the second axis that result in generating a recommendation to initiate the recovery of the fault domain of the storage system.

Step 204, in some embodiments, includes generating a recommendation to initiate the recovery responsive to at least one of: the average fault score for the metadata types specified in the plurality of faults being above a first designated threshold and the standard deviation of the average fault score for the metadata types specified in the plurality of faults being below a second designated threshold; and the average fault score for the fault reason codes specified in the plurality of faults being above a third designated threshold and the standard deviation of the average fault score for the fault reason codes specified in the plurality of faults being below a fourth designated threshold. In other words, a recommendation to initiate the recovery may be generated when the average fault score (for the metadata types or fault reason codes) is "high" while the corresponding standard deviation of the average fault sore is "low."

Figure 3:
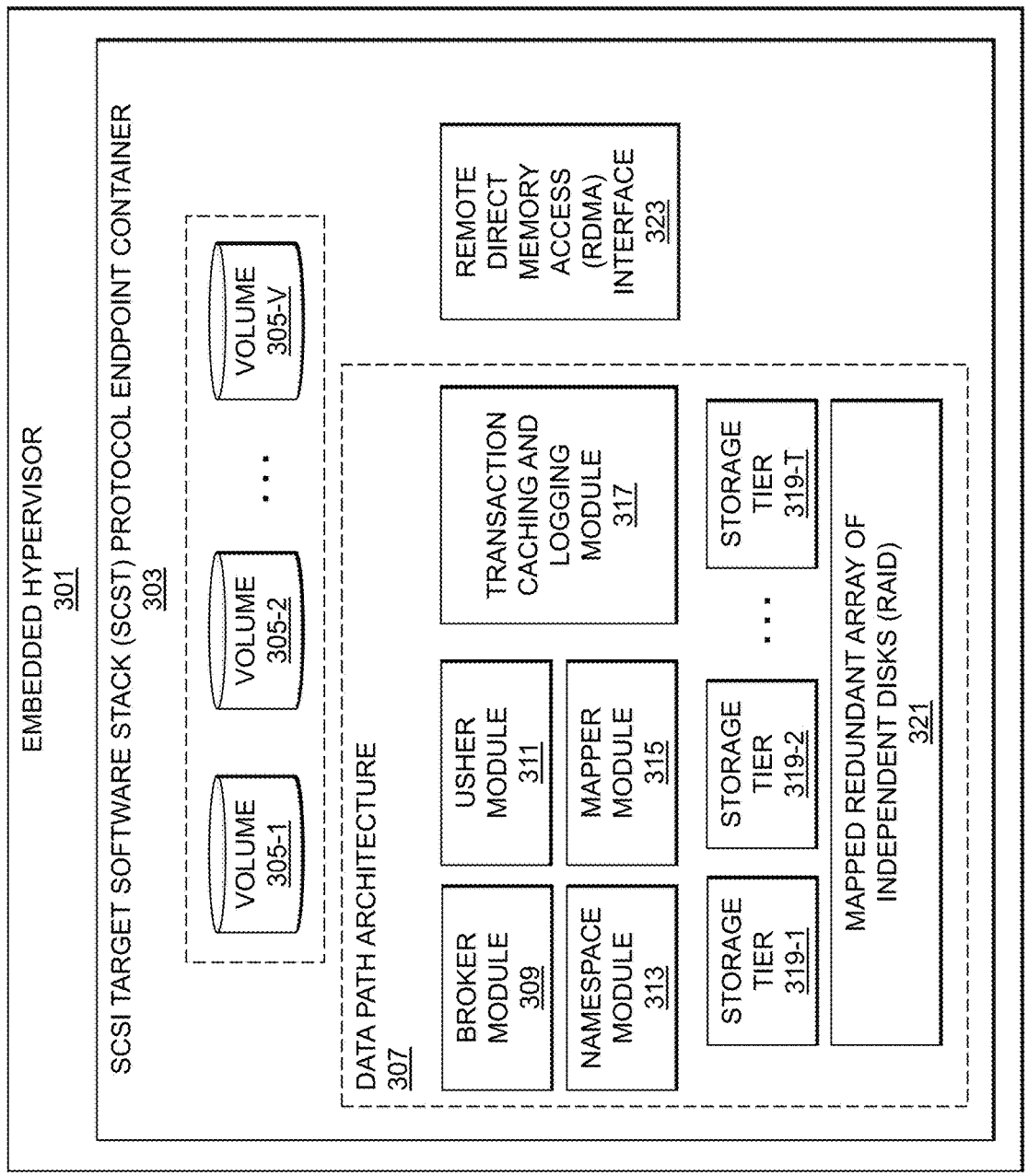
FIG. 3 is a block diagram of an embedded hypervisor implementing a data path architecture in an illustrative embodiment.

FIG. 3 shows a view of a data path architecture 307 for an I/O stack of a storage array (e.g., storage array 106-1). The data path architecture 307 is assumed to be implemented on an embedded hypervisor 301 (e.g., a VMware ESXi™ hypervisor) that runs a base container 303 providing an SCSI target software stack (SCST) protocol endpoint. The embedded hypervisor 301 is an example of a "virtual" storage controller of a storage system (e.g., a virtual one of the storage controllers 110 in storage array 106-1). The SCST protocol endpoint container 303 includes a set of volumes 305-1, 305-2, . . . 305-V (collectively, volumes 305) and the data path architecture 307. The data path architecture 307 includes a broker module 309, usher module 311, namespace module 313, mapper module 315, and a transaction caching and logging module 317. The data path architecture 307 also includes a set of storage tiers 319-1, 319-2, . . . 319-T (collectively, storage tiers 319) and a mapped redundant array of independent disks (RAID) 321. The transaction caching and logging module 317 is configured to utilize remote direct memory access (RDMA) interface 323 as described in further detail below.

The broker module 309 is configured to facilitate communication amongst the various other modules of the data path architecture 307. In some embodiments, the data path architecture 307 implements a layered services model (e.g., for copy engines, replication, migration, etc.). The usher module 311 is configured to implement I/O request queues, including priority share-based scheduling and Quality of Service (QoS) for I/O requests in such queues. The namespace module 313 is configured to implement active/active "thin" volumes and maintain volume attributes. The namespace module 313 is also configured to implement a key-value (K-V) store and directories. The mapper module 315 is configured to implement a thin mapping layer using log-structured writes, with inline compression, deduplication and pattern matching functionality. The mapper module 315 is also configured to implement functionality for snapshotting and determining snapshot differentials, for performing space accounting, and for file system checking (e.g., using a tool such as a Linux file system consistency check (FSCK) tool). The transaction caching and logging module 317 is configured to implement transactions for the active/ active volumes, to perform distributed locking, and to implement read/write-back and write-ahead logs. The transaction caching and logging module 317 may comprise two instances, one for data and one for metadata. The mapped RAID 321 is configured to implement distributed virtual striping (e.g., using 4+1 and 8+1 RAID5 implementations) and to provide thin rebuild and distributed sparing. The mapped RAID 321 may support various native block sizes (e.g., 512 bytes (B), 4096B or 4 kilobytes (KB), etc.).

In some embodiments, the usher module 311 implements a data plane polling model. From the producer side (e.g., of the SCST protocol endpoint), requests are submitted using per-core threads. Polling threads pull new I/O requests to user space. The polling threads may execute when associated data plane threads are idle. Load balancing, affinity and QoS (e.g., share-based scheduling and traffic shaping) features may be provided.

The namespace module 313, as described above, is configured to create and expose thin block volumes, and provides functionality for volume management and attributes as well as space management and accounting. The namespace module 313 enables or provides a namespace layer that utilizes a block interface with file-like semantics. In the namespace layer, volumes (e.g., volumes 305) are bound to block protocol endpoints (e.g., PE LUNs). The mapper module 315 enables or provides a mapping layer, which exposes a single contiguous thin address space to the namespace layer. The namespace layer consumes the logical address space provided by the mapper layer.

The namespace layer may use a format that includes a "super block" created by an internal format and anchored at a logical block address (LBA) of 0. The super block identifies locations of allocations, an inode table, and a "root" directory. The allocations provide references to extent allocators, used to manage free space, as well as to inodes. The extent allocators may use a binary buddy system, and enable efficient reclaiming and defragmenting functionality. In some embodiments, the minimum allocation size is 8 MB, and the minimum allocation size for virtual volumes (VVols) such as volumes 305 is 2 GB. The volume allocation aligns to the "mid" level of the mapper as described in further detail below.

The inode allocators provide references to an inode table, which in some embodiments is scalable to millions of inodes and is organized as a free list. An inode may include various content, such as an object type (e.g., file, directory), family universally unique identifier (UUID), inode number and generation, link count, unique identifier (UID) owner, global identifier (GID) owner, object extent location, create and other timestamps, parent inode number, parent directory cookie, etc. The root inode references a root directory object that contains a list of filenames and inodes, while additional inodes contain volume data (e.g., by allocating a data extent and inode, and adding the volume name and inode to the root directory). Multiple volume data extents may be created. Object handles may be used by the usher module 311 to submit I/O thru handles (e.g., inodes) to avoid unnecessary name lookup.

The transaction caching and logging module 317 may implement a transaction cache and a transaction log. The transaction cache, in some embodiments, is transactional and provides read and write cache buffering with two instances (e.g., data and metadata). The transaction cache pages data and metadata in and out of memory, and provides local and distributed peer-to-peer (P2P) sticky locks. In some embodiments, an active/active configuration, an ALUA configuration, or combination thereof may be used. For example, the data path architecture 307 may be active/active, while SCST supports both active/active and ALUA. The transaction log provides write-ahead transaction logs, such as by using low latency mirrored NVRAMs for persistence. The transaction cache, for example, may be implemented in-memory (e.g., DRAM), while the transaction log is persisted to NVRAM.

The mapper module 315, as noted above, may provide a mapping layer of the data path architecture 307. The mapping layer may provide various functionality, such as enabling patterns, deduplication, compression, and mapping. Pattern functionality includes storing patterns (e.g., rather than pointer+data), and re-generates data on read, and may include 4 KB of 0 s or 1 s (where, in this context, 0 s are different than unmapped space). Deduplication functionality includes the use of a fingerprint cache and read and compare validation. Compression functionality may include the use of various types of compression algorithms, including QAT hardware offload, LZ Deflate, Dynamic Huffman, etc. In some embodiments, data is compressed and packed into 2 MB data stripes. The mapping functionality includes a thin map, implemented in some embodiments as a 512-way B-tree structure described in further detail below. The thin map in such embodiments is keyed by LBA (e.g., rather than using content-addressable storage (CAS)), and provides snapshot and differential capability along with copy-by-reference. The mapper module 315 may utilize the storage tiers 319 (e.g., using flash tiers, storage-class memory (SCM) tiers, NVRAM tiers, etc.).

Figure 4A:
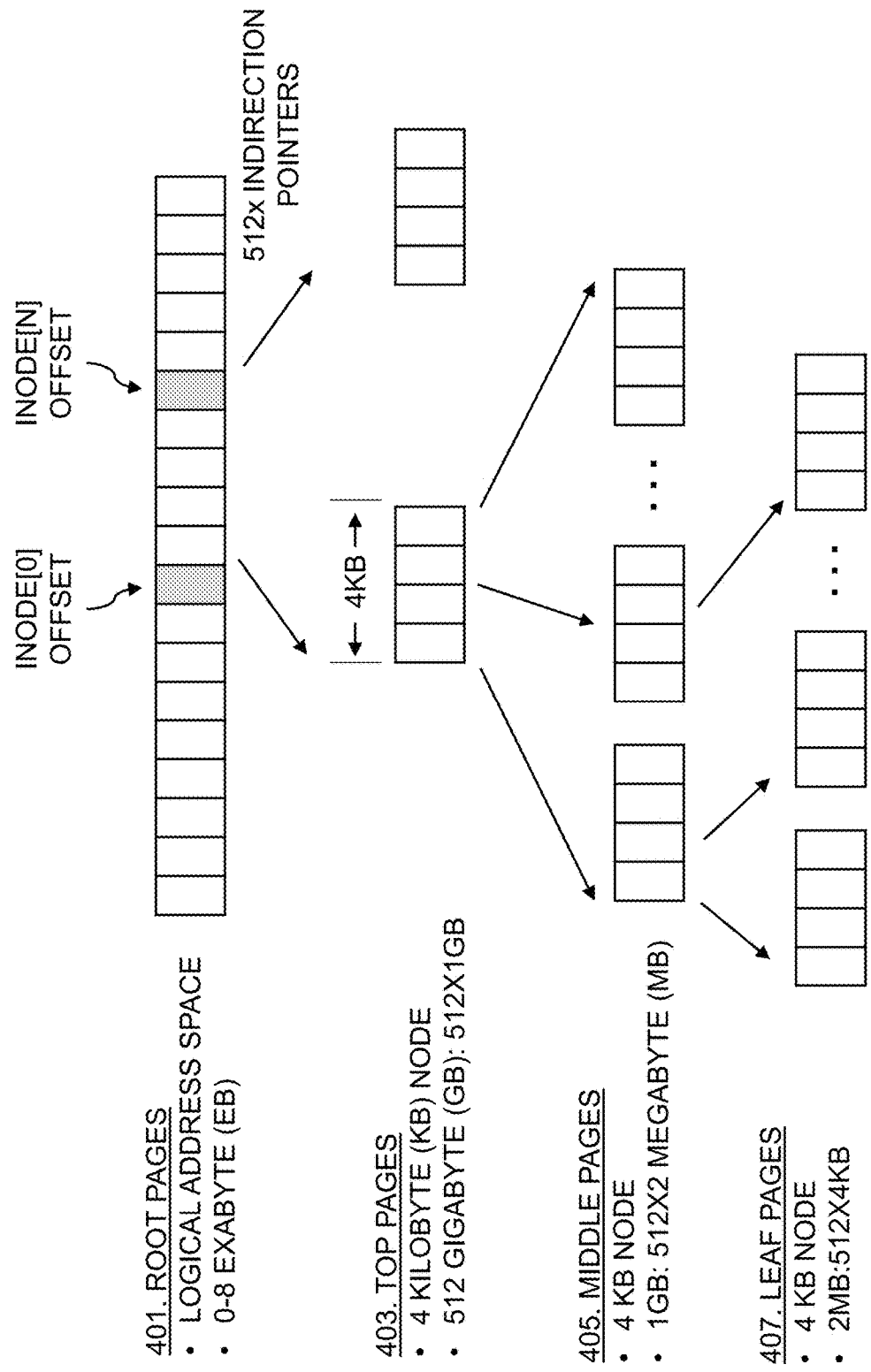
FIGS. 4A and 4B illustrate a tree structure for a logical address space in an illustrative embodiment.
Figure 4B:
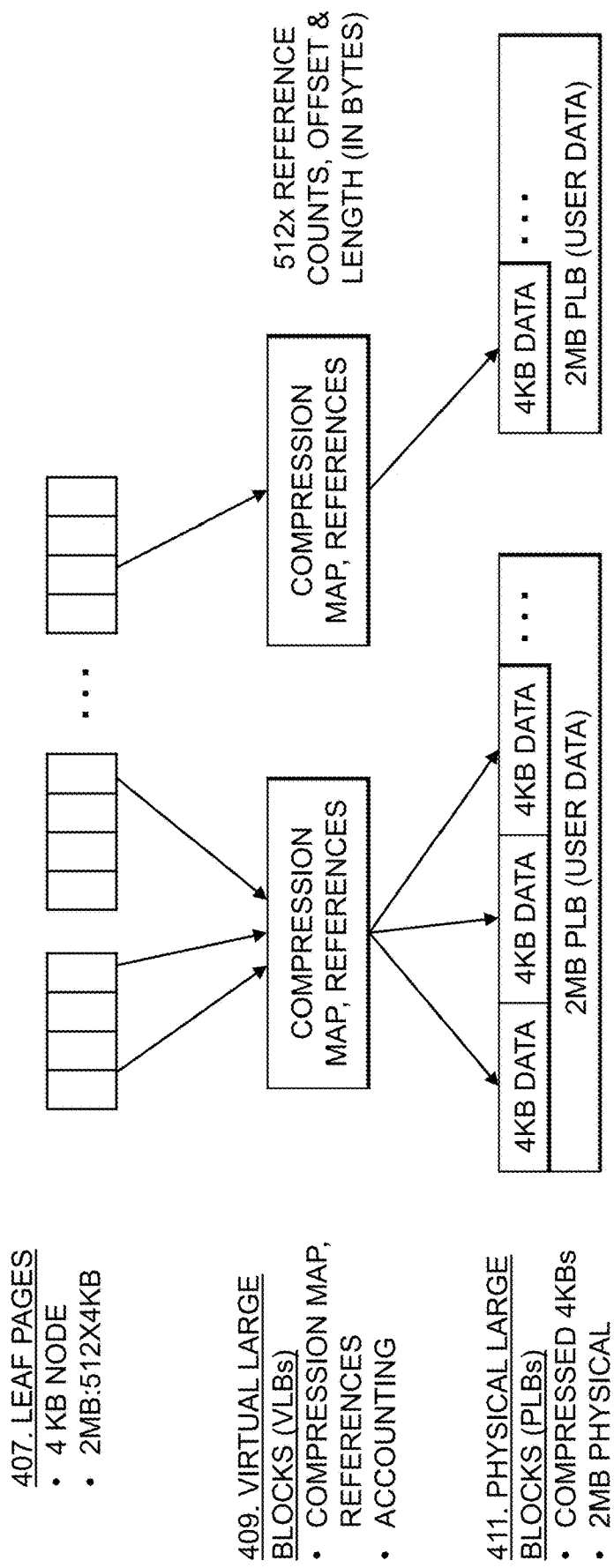

FIGS. 4A and 4B show a tree structure utilized by the mapper module 315 to store data in some embodiments. As noted above, the tree structure may comprise a 512-way B-tree structure, with levels for root pages 401, top pages 403, middle ("mid") pages 405, leaf pages 407, virtual large blocks (VLBs) 409, and physical large blocks (PLBs) 411. As illustrated in FIG. 4A, the root pages 401 provide a logical address space, which in some embodiments ranges from 0 to 8 exabytes (EB). The logical address space, which may be a thin logical address space, includes various inode offsets, two of which are labeled (e.g., inode[0] and inode[1]). Each of the inode offsets for the root pages 401 include a 4 KB node with 512 indirection pointers to respective ones of the top pages 403, each of the top pages 403 also has a 4 KB node with 512 pointers to respective ones of the middle pages 405, and each of the middle pages 405 has a 4 KB node with 512 pointers to respective ones of the leaf pages 407. Each of the leaf pages 407 may represent 2 megabytes (MB), and thus a given one of the middle pages 405 may represent 1 gigabyte (GB) (e.g., 512 of the leaf pages 407×2 MB) and a given one of the top pages 403 may thus represent 512 GB (e.g., 512 of the middle pages 405×1 GB).

As illustrated in FIG. 4B, each of the leaf nodes 407 may include 512 pointers to VLBs 409 each representing 4 KB (e.g., such that a given one of the leaf nodes 407 represents 2 MB as noted above, as 512×4 KB=2 MB). The VLBs 409 include reference counts, compression maps, and accounting information (e.g., offset and length, in bytes (B)) for the PLBs 411. Each of the PLBs 411 provides 2 MB physical space for storing user data (e.g., as a set of 4 KB compressed data blocks).

The mapper module 315 may access the tree structure of FIGS. 4A and 4B using keys, where a key for the root pages 401 level includes a host LBA and inode offset and index, where the index is the key divided by 256 terabytes (TB). At the top pages 403 level, the index is the key modulo 512 GB.

At the middle pages 405 level, the index is the key modulo 1 GB. At the leaf pages 407 level, the index is the key modulo 2 MB.

Figure 5B:
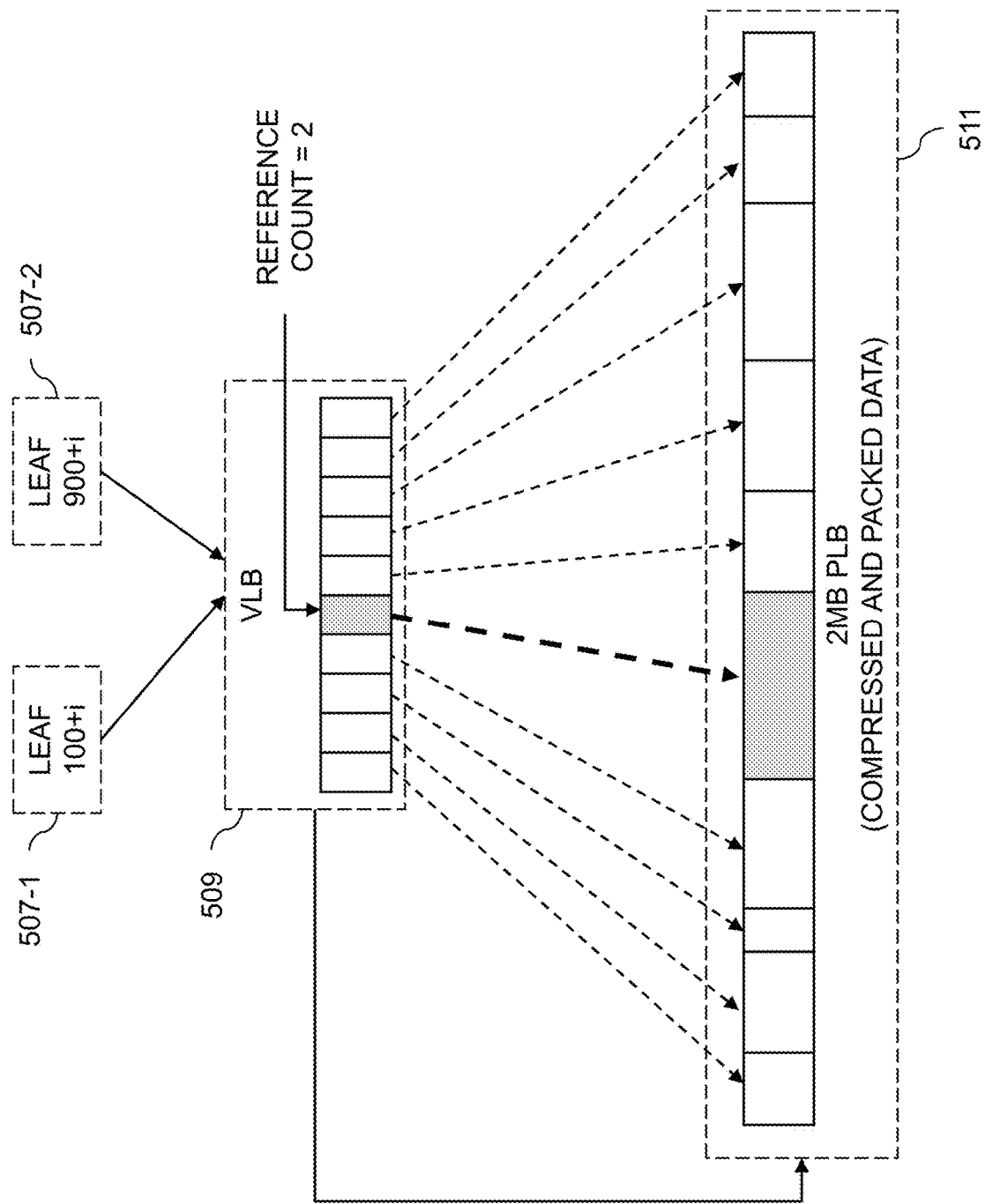

FIGS. 5A and 5B show deduplication using VLBs of the tree structure of FIGS. 4A and 4B. FIGS. 5A and 5B show a given VLB 509 and associated PLB 511 which includes 2 MB of compressed and packed data. The VLB 509 is assumed to contain a block address of the PLB 511, which provides a 2 MB data extent, and an array with 512 virtual entries. The virtual entries of a VLB, such as the 512 entries of VLB 509 in the example of FIGS. 5A and 5B, may be associated with respective virtual block addresses. Each VLB may thus be associated with a VLB extent that comprises a range of virtual block addresses (a VLB extent, in some cases, may include multiple VLBs such that its associated range of virtual block addresses span the multiple VLBs).

Each of the 512 virtual entries of the VLB 509 includes a byte offset to where a compressed 4 KB data portion starts in the PLB 511, as well as a byte length of the compressed 4 KB data portion and a reference count (e.g., the number of leaf page references to that compressed 4 KB data portion). In FIG. 5A, one leaf page 507-1 (e.g. leaf 100+i) references a particular compressed 4 KB data portion (e.g., shaded in gray) in the PLB 511. Thus, as shown in FIG. 5A, the reference count in the VLB corresponding to that portion (e.g., also shaded in gray) is 1. FIG. 5B shows that, when another leaf page 507-2 (e.g., leaf 900+i) also references that particular portion in PLB 511, the reference count for that portion in VLB 509 is updated to 2. In this way, two or more leaf pages can reference the same virtual block address. In the example of FIGS. 5A and 5B, deduplication has a granularity of 4 KB (e.g., the size of each compressed data portion in the PLB 511). Some embodiments enable a global deduplication domain, where any of the leaf pages can reference any of the compressed data portions in any of the PLBs. The reference count, however, may limit deduplication to a certain amount (e.g., 256:1).

To implement deduplication, a deduplication "fingerprint" cache may be utilized. The fingerprint cache may be implemented as a large K-V store, with N-way associative hashes providing fast, in-memory lookup that enables verification of deduplication with read and compare. Consider a piece of data, denoted $data_1$, that is found in the fingerprint cache. This may include hashing $data_1$, where the hash matches a key in the K-V store corresponding to a given VLB. The given VLB is then fetched to find the page referenced, and the corresponding portion of the associated PLB is read, decompressed and then compared to verify that $data_1$ is a duplicate. Consider another piece of data, denoted $data_2$, that is not found in the fingerprint cache. In this case, a new entry is added to the K-V store (e.g., a new K-V pair). If there is no remaining space, entries may be evicted using any suitable cache replacement algorithm, such as a least recently used (LRU) cache replacement algorithm. The $data_2$ is then stored as a new 4 KB data block in one of the PLBs.

The mapper module 315 may implement log-structured writes for efficient full stripe RAID writes (e.g., where each stripe is 2 MB continuing the example above) to flash memory using mapped RAID 321. Pending writes are flushed from the transaction cache or transaction log cache implemented by transaction and log caching module 317. Patterns and duplications are subtracted, then the data is compressed and packed into a stripe. The full stripe is then written and mapped to the thin address space.

Figure 6A:
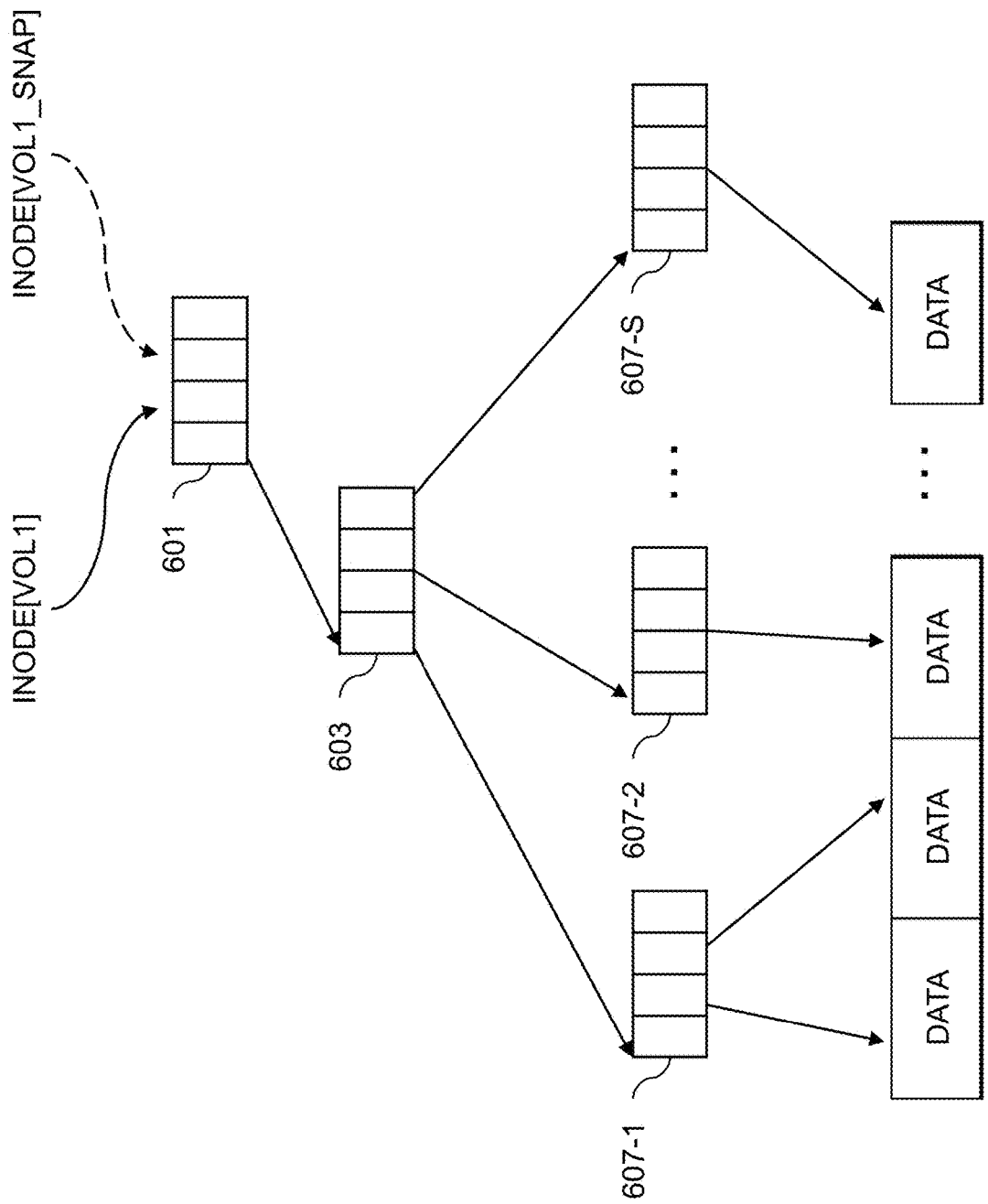
FIGS. 6A-6D illustrate snapshotting using the tree structure of FIGS. 4A and 4B in an illustrative embodiment.
Figure 6B:
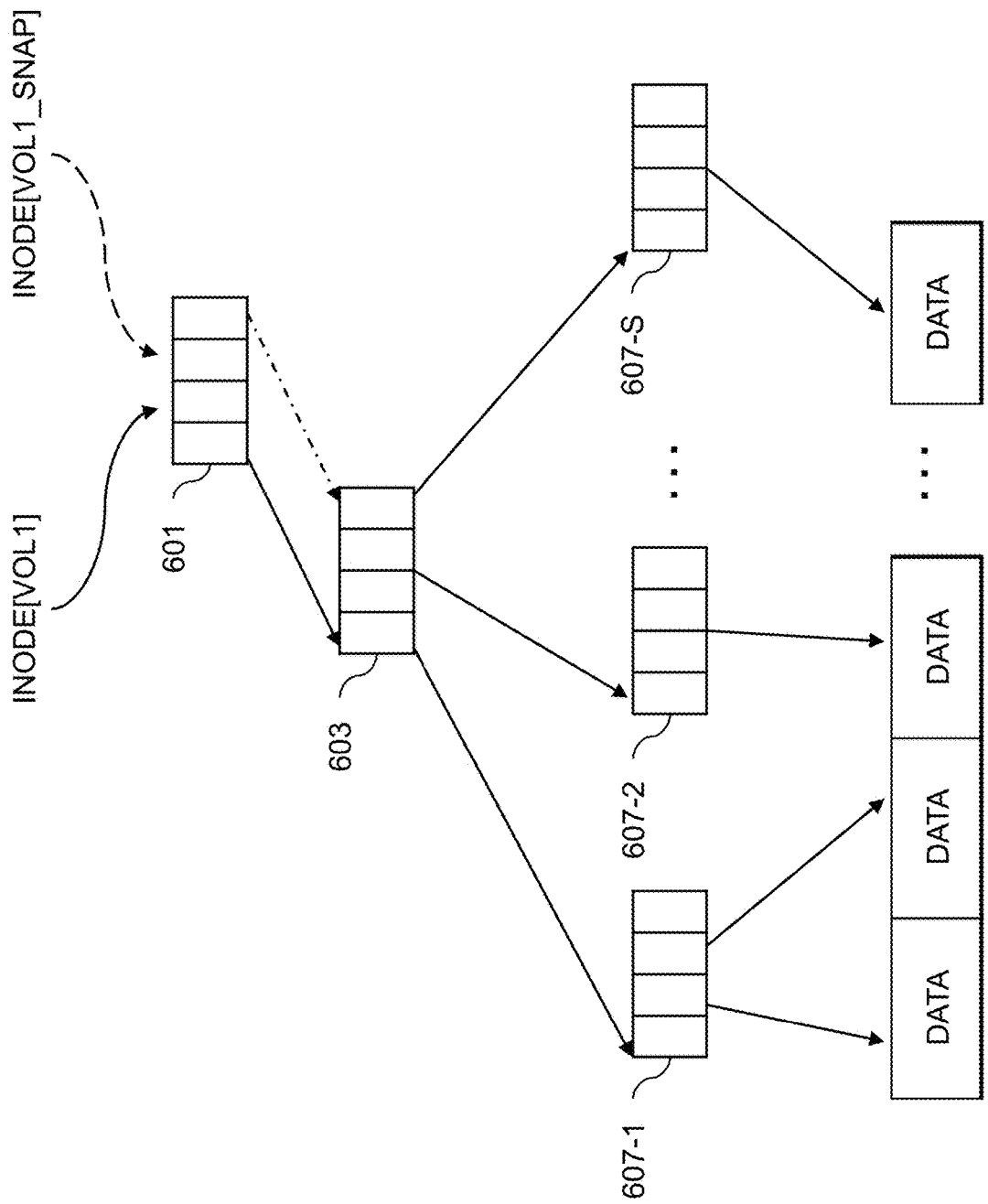
Figure 6C:
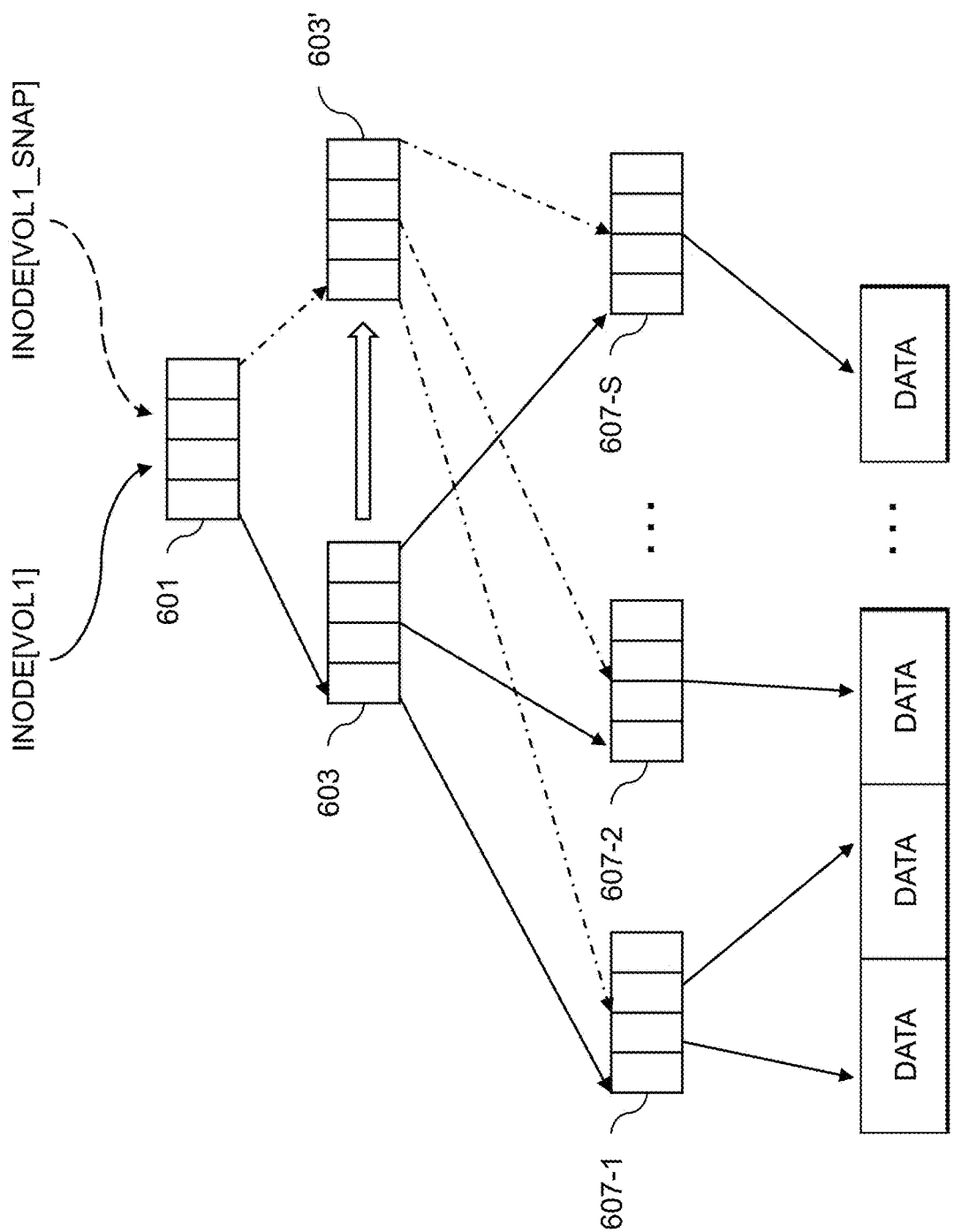
Figure 6D:
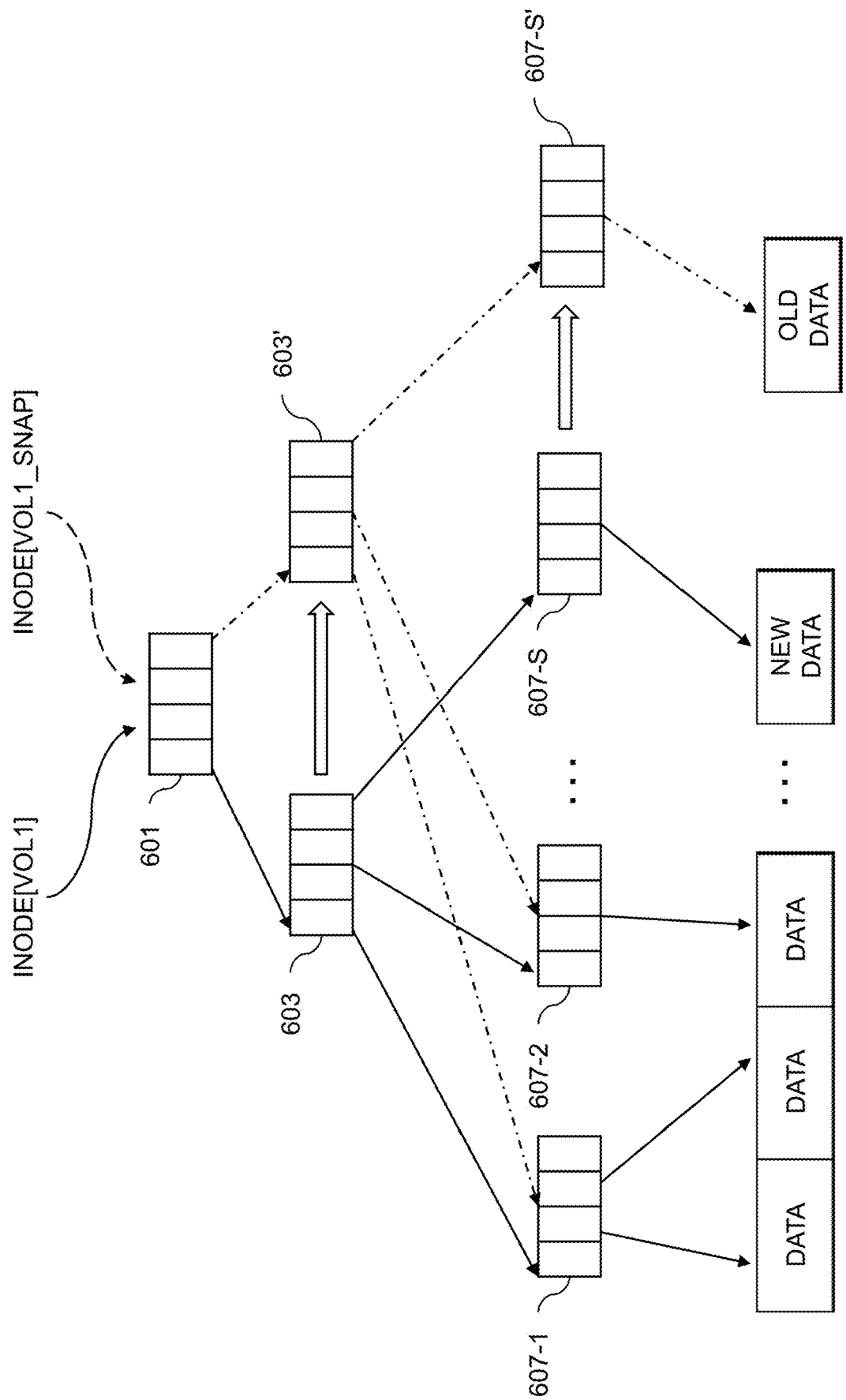

FIGS. 6A-6D illustrate snapshotting functionality enabled by the mapper module 315 using the B-tree structure described above with respect to FIGS. 4A and 4B. As shown in FIG. 6A, a particular inode for a volume (e.g., inode [vol1]) references a particular root page 601, which reference a top page 603, which references a set of middle pages (not shown), which references a set of leaf pages 607-1, 607-2, . . . 607-S (collectively, leaf pages 607) which reference underlying data (e.g., through VLBs and PLBs not shown). When a snapshot of the volume is created, another inode is allocated (e.g., inode[vol1_snap]) that references the root page 601 and copy-by-reference is performed as shown in FIG. 6B. On a first write to the volume (e.g., to vol1), the nodes of the tree structure are split in a recursive manner. First, the top page 603 is copied to top page 603' as shown in FIG. 6C. Middle pages (not shown) are then copied, follow by copying one of the leaf pages 607 affected by the write. As shown in FIG. 6D, this includes copying leaf page 607-5 to leaf page 607-S'. The new data to be written is stored in one or more VLBs and PLBs referenced by leaf page 607-S, while the old or existing data is stored in one or more VLBs and PLBs referenced by leaf page 607-S'.

The mapped RAID 321, as noted above, implements virtual striping (e.g., using 4+1 and 8+1 RAID5), enabling thin rebuild, distributed sparing, and various native block sizes (e.g., 512 B, 4096 B, etc.). The RAID geometry may be selected based on the number of SSD disks (e.g., with 6-9 SSDs, 4+1 RAID may be used, with 10+ SSDs, 8+1 RAID may be used). It should be noted that embodiments are not limited to using SSD disks in a RAID. In other embodiments, other types of disks or storage devices may be used. The description below, however, assumes the use of SSDs for clarity of illustration. In some cases, the mapped RAID 321 may use resiliency sets, as reliability may drop as more SSDs are grouped together. To constrain the fault domain, resiliency sets may be split once a threshold number of SSDs is reached (e.g., with a 25 SSD maximum, the resiliency set is split on adding a $26^{th}$ SSD).

In some embodiments, the mapped RAID 321 includes a disk layout that has a minimum number of 6 SSD disks (e.g., flash SSDs or 3DXP SSDs). Serial attached SCSI (SAS) expansion may be used to expand the number and size of disks used. In some embodiments, particular slots or disks (e.g., 2 or 4 NVRAM SSDs) may be reserved for use as the transaction log cache implemented by transaction caching and logging module 317. A global configuration database (DB) may be stored using 1 MB on each drive in the mapped RAID 321, which includes a GUID and drive state information. The mapped RAID 321 may include a RAID map DB that is 3-way mirrored across three of the disks, and includes information such as RAID type, width, etc. The mapped RAID 321 also utilizes metadata, data, and possibly other tiers. The mapper module 315 is configured to expand the tiers for more space, where expanding a tier includes forming a RAID geometry by allocating slices, adding to the RAID map, and returning to the mapper layer. A slice of the mapped RAID 321 may include 4 GB RAID allocation extents (NVRAM may use 128 MB), one or more "ubers" that each include N+1 slices grouped into a RAID set (e.g., 1+1, 4+1, 8+1, etc.), and one or more tiers each including a group of ubers.

In summary, the data path architecture 307, on receiving an I/O request from a host to store data, will write the data quickly and persistently to a cache (e.g., the transaction cache implemented by the transaction caching and logging module 317) and then send an acknowledgement to the host. The data path architecture 207 will then utilize the mapper module 315 identify and subtract patterns and duplicates in the data to form a flush set (e.g., a 2 MB flush set). The flush set is then compressed, packed and written to 2 MB stripes (e.g., in the mapped RAID 321).

In a log structured file system, such as that used in the data path architecture 307, mappings (e.g., as provided using the mapping module 315) provide critical information that links the user data to the physical location on the storage devices (e.g., SSDs). With deduplication, multiple logical blocks can point to the same virtual block address of a given VLB. In this case, the VLB includes virtual entries for each virtual block address, with a given virtual entry maintaining a reference count indicating how many logical blocks point to a given virtual block address. When file system checks (e.g., using a tool such as FSCK) are run, the consistency of the map is validated by cross-checking the reference count stored in the virtual entry of the VLB with the number of logical blocks pointing to the virtual block address. In a map with a large number (e.g., millions, billions, etc.) of virtual block addresses with associated virtual entries in the VLBs, the file system check should run as quickly as possible to validate the consistency of the map while reducing downtime. Since the map can be very large, the parsed data in some cases cannot be kept in memory and thus needs to be persisted to disk. As a given logical block may point to disparate virtual block addresses (e.g., in different VLBs), the file system check may need to issue a large number (e.g., millions, billions, etc.) of single-block reads and writes (e.g., to issue random reads to obtain the reference count for a virtual block address and the increment it, which will later be compared for consistency). Significant efficiencies may be achieved by coalescing entries into a buffer, and then writing them out as single large blocks and also reading them as single large blocks.

As a storage system (e.g., storage array 106-1, a clustered storage system including the storage array 106-1 and one or more other ones of the storage arrays 106-2 through 106-M, etc.) operates, various faults or errors may be encountered (e.g., hardware errors such as media errors, software errors such as checksum mismatch, etc.). To recover from some faults, it may be necessary to take at least a portion of the storage system offline to run a file system consistency check (e.g., using FSCK or another suitable tool). Taking the storage system or a portion thereof offline, however, is disruptive to hosts that issue I/O requests to the storage system (e.g., host devices 102 or applications or processes running thereon, etc.).

Figure 7:
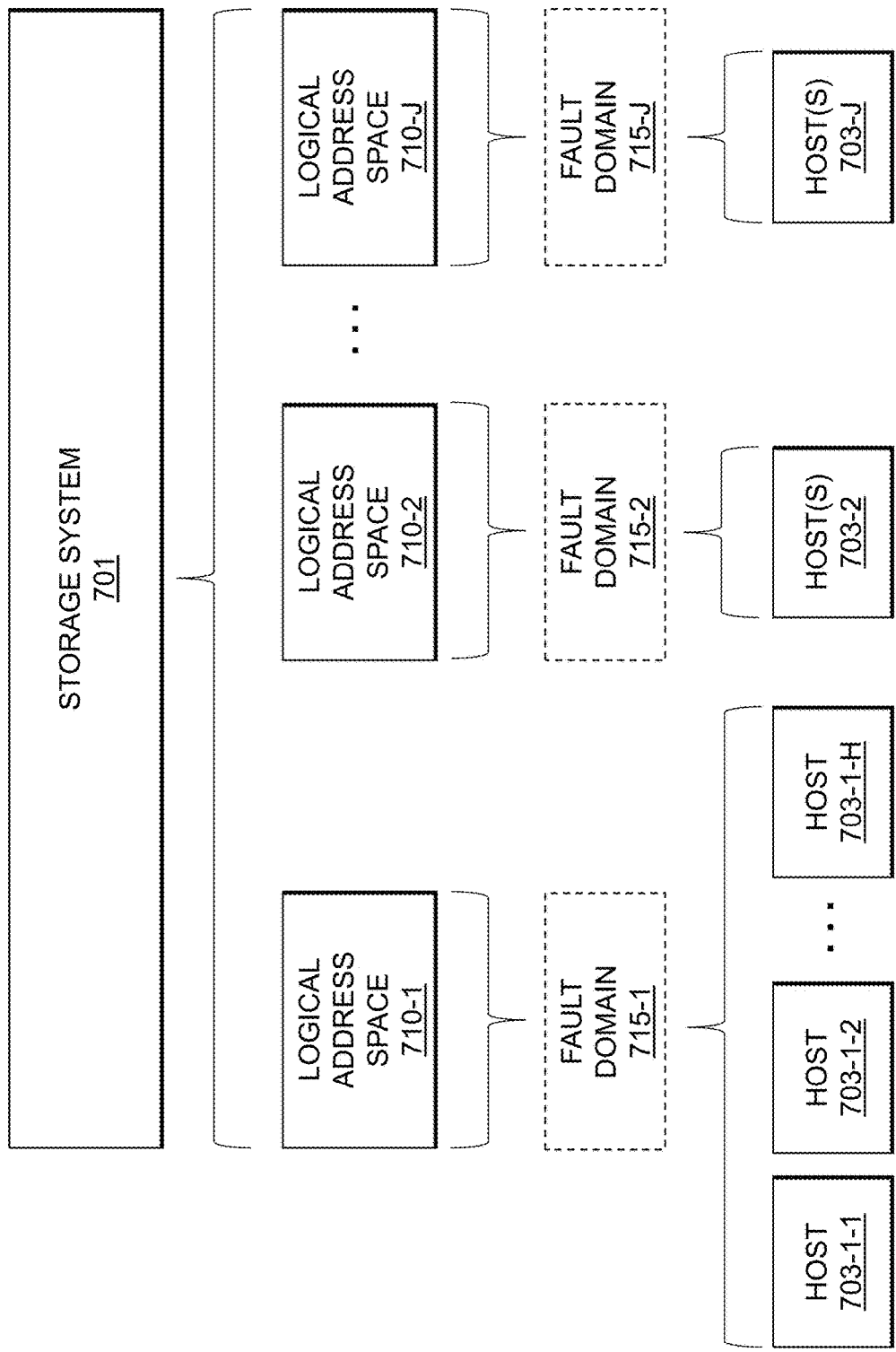
FIG. 7 illustrates fault domains for a storage system in an illustrative embodiment.

FIG. 7 illustrates a storage system 701 that implements multiple logical address spaces 710-1, 710-2, . . . 710-J (collectively, logical address spaces 710) associated with respect fault domains 715-1, 715-2, . . . 715-J (collectively, fault domains 715). The logical address spaces 710, in some embodiments, may be entirely distinct logical address spaces. In other embodiments, two or more of the logical address spaces 710 (e.g., logical address space 710-1 and 710-2) may be associated with different partitions of the same logical address space. Each of the fault domains 715 is associated with a set of hosts that issue I/O requests to the storage system 701. For example, fault domain 715-1 is associated with a set of hosts 703-1-1, 703-1-2, . . . 703-1-H (collectively, hosts 703-1). Fault domains 715-2 through 715-J are similarly associated with respective sets of hosts 703-2 through 703-J.

To minimize disruption due to faults, one approach is to utilize many different fault domains 715, up to using a separate fault domain for each host that utilizes the storage system 701, such that faults or errors encountered by any one host associated with a given fault domain does not disrupt use of the storage system 701 by any other host. Such an approach, however, has drawbacks in terms of storage utilization, as the same data may be stored in multiple physical locations on the storage system 701 (e.g., once for each host that stores data on the storage system 701). Consider, as an example, a storage system 701 that is utilized by different hosts of a same business, organization, or other enterprise. There may be significant overlap in the data (e.g., documents, media, etc.) stored by each of those hosts on the storage system 701. Even a comparatively small file (e.g., with a size of a few KB or MB) that must be stored hundreds or thousands of times will result in significant inefficiencies. This problem is exacerbated with larger files (e.g., video and other types of media files, which may be hundreds of MB, several GB or larger).

When multiple hosts share a single one of the fault domains 715 (e.g., hosts 703-1 sharing fault domain 715-1), such storage inefficiencies may be reduced though deduplication functionality such as that utilized in the data path architecture 307 described above. Data reduction efficiency may therefore be improved by reducing the number of fault domains 715 of the storage system 701 (e.g., including where the storage system 701 provides just a single fault domain shared by all of the hosts accessing the storage system 701). Such data reduction efficiencies, however, should be balanced against the desire to avoid disruption to the hosts when encountering faults or errors. When a fault or error affects a particular ones of the fault domains 715 (e.g., fault domain 715-1) that is shared by multiple hosts (e.g., hosts 703-1), there is a need to determine whether that fault or error should cause initiation of a recovery process that disrupts use of the fault domain 715-1. It may be desired, for example, to delay running the recovery process until some threshold number of faults or errors are encountered, until faults or errors affect some threshold number of the hosts 703-1 accessing the fault domain 715-1, until the faults or errors affect some threshold amount of the logical address space 710-1 associated with the fault domain 715-1, etc.

Illustrative embodiment provide techniques for fault analysis to determine when to run such a recovery process. The techniques described herein enable generation of easily consumable summary analytics for determining when to run a recovery process for a storage system. Such summary analytics, in some embodiments, is provide to a storage administrator, service personnel, or other authorized user associated with the storage system (e.g., a service technician, customer or other user of a storage system, etc.). It should be appreciated that the term "user" herein is intended to be broadly construed so as to encompass numerous arrangements of human, hardware, software or firmware entities, as well as combinations of such entities. Thus, in some embodiments, the summary analytics may be provided as input to a software tool or other process that automatically determines whether to run the recovery process without requiring manual input.

In some embodiments, detailed information regarding individual faults or errors is maintained in a fault database or datastore. Such information, however, is not easily consumable. Thus, there is a need for generating summary analytics for determining when to run the recovery process. The summary analytics may be generated from the information in the fault database, which captures fault alerts or errors raised during operation of the storage system. The decision of when to initiate recovery, in some cases, may be based on various other criteria in addition to or in place of fault or error information. As an example, an offline metadata tier of a storage system may be filling up the fault database, which may be a reason to initiate a recovery process. Various other conditions may trigger initiation of a recovery process.

Figure 8:
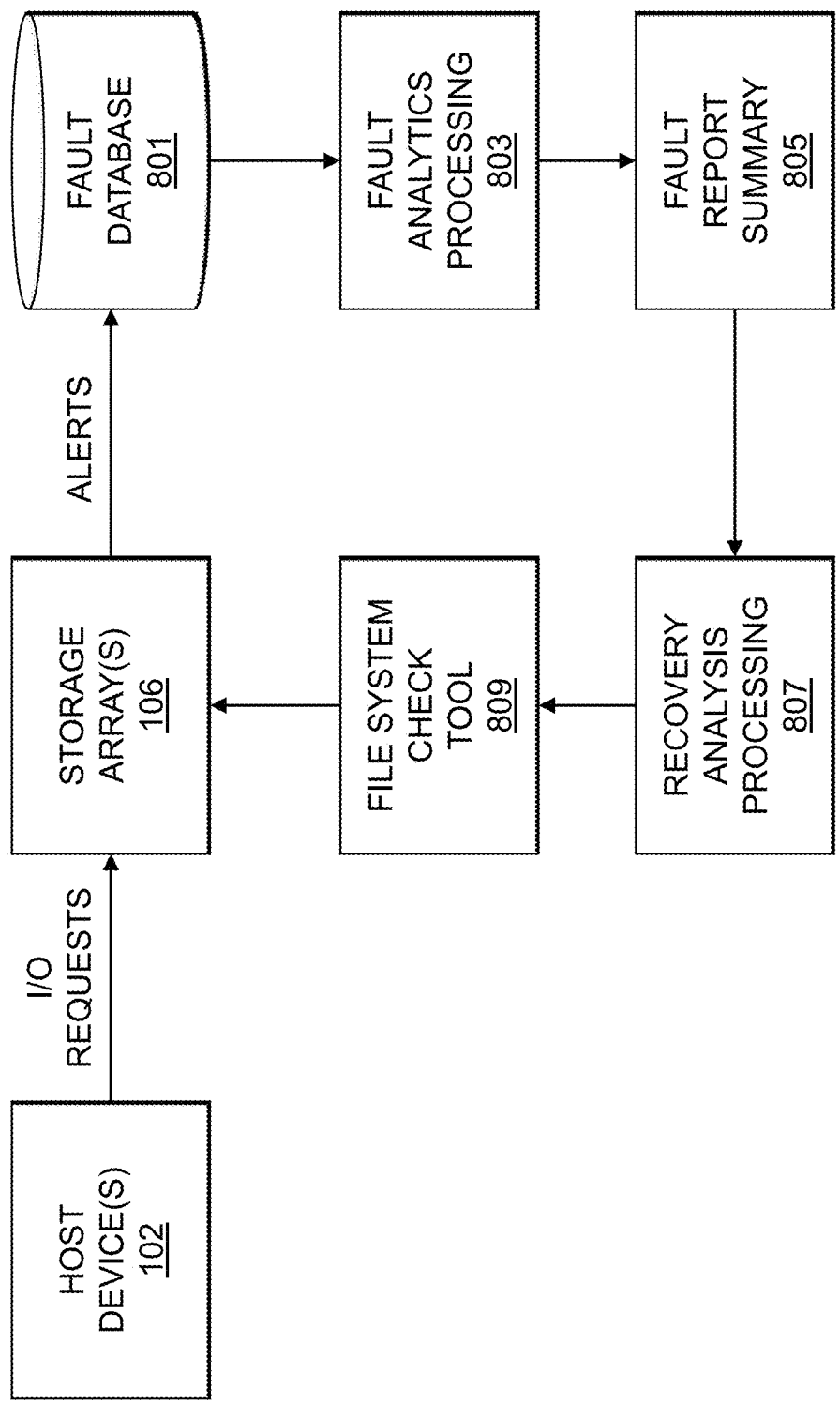
FIG. 8 shows a system flow for determining when to initiate recovery of a storage system in an illustrative embodiment.

FIG. 8 shows a system flow for determining when to initiate recovery of a storage system, which is assumed to comprise one or more of the storage arrays 106 in FIG. 1. As shown in FIG. 8, the host devices 102 issue I/O operation requests to the storage arrays 106. When the storage arrays 106 detect faults or errors during I/O operations, alerts are sent to a control path (described in further detail below in conjunction with FIG. 11) for storage in a fault database 801. The alerts, in some cases, may also be provided to a storage administrator, service personnel or other authorized user associated with the storage arrays 106. For example, when a particular fault alert is sent to the control path, the control path may generate a notification (e.g., an email, message, etc.) that is sent to the storage administrator, service personnel or other authorized user to inform them about the fault encountered. The storage administrator, service personnel or other authorized user may login to the system and read the fault database 801 to understand the reason for the alert. If the storage arrays 106 are online and a threshold number (e.g., which may be set by the storage administrator, service personnel or other authorized user) of faults are aggregated in the fault database 801, fault analytics processing 803 may be initiated.

The fault analytics processing 803 may include running a fault analytics tool (FAT) to determine whether recovery should be run or not. The fault analytics processing 803 or FAT, in some embodiments, is configured to assign a score to each fault reason code and fault meta type. A fault score for the fault reason code may be based at least in part on the source of the error (e.g., a hardware error or a software error). For example, a media error of a data block may be assigned a lower fault score than a checksum mismatch error of a metadata block, as the checksum mismatch may be caused by a logical bug, race condition or an overwrite software bug that may happen on any block (e.g., multiple metadata and data blocks). It should be appreciated, however, that in other embodiments a media error or other type of hardware error may be assigned a higher fault score than certain types of software errors. The particular logic for assigning fault scores may be modified as desired by a storage administrator, service personnel or other authorized user.

Based on the assignment of the fault score, the fault analytics processing 803 or FAT can provide various statistics (e.g., for the storage arrays 106 as a whole, for a particular one of the storage arrays 106, for a particular fault domain or group of fault domains on one or more of the storage arrays 106, etc.). Such statistics may include, but are not limited to, one or more of: unique faults; the frequency distribution of different metadata types; the frequency distribution of different fault reason codes; average fault reason score; average fault meta type; standard deviation of fault reason score; standard deviation of fault meta type score; total data unavailable; total space unavailable; potential data and metadata recoverable; potential data recoverable per-volume; potential data recoverable per-family (e.g., a snapshot family or snapshot group); potential data loss; total space recoverable; minimum number of volumes impacted; minimum number of families impacted; data unavailable per-volume; data unavailable per-family; fault correlation based on timestamp; etc. Based on the above statistics, the fault analytics processing 803 generates a fault report summary 805 that is provided to recovery analysis processing 807.

The fault report summary 805, in some embodiments, includes an overall or summary fault score. If the overall or summary fault score is above some designated threshold, the fault report summary 805 may recommend that recovery be run. Otherwise, the storage arrays 106 may continue normal operation. The recovery analysis processing 807 takes the information from the fault report summary 805 to determine whether to run the recovery by initiating a file system check tool 809 that scans and repairs faults on the storage arrays 106.

The recovery analysis processing 807 may make the determination on whether to run the recovery based not only on the recommendation included in the fault report summary 805, but also on various other factors. For example, the recovery analysis processing 807 may determine the storage volumes that would be impacted by the faults and/or by running the recovery, and identify whether any of the storage volumes are deemed critical or have other characteristics which may overrule the recommendation included in the fault report summary 805. For example, if a critical storage volume would be impacted by a particular fault, it may be desired to run the recovery even if the fault report summary 805 does not recommend doing so. As another example, if running the recovery would not disrupt any critical storage volume, the recovery may be run even if the fault report summary 805 does not recommend doing so. Various other examples are possible, including instances where a recommendation to run recovery in the fault report summary 805 is overridden such that the recovery is not run (e.g., where the impacted volumes are not deemed critical, etc.).

In some cases, information on the impacted storage volumes may be presented to the storage administrator, service personnel or other authorized user to make an informed selection as to whether to run the recovery process. In other cases, information regarding importance, criticality or other characteristics of the impacted storage volumes may be stored in the fault database 801 (e.g., in association with ones of the faults that impact such storage volumes, in a separate data structure, etc.).

Although FIG. 8 shows the fault database 801, fault analytics processing 803, fault report summary 805, recovery analysis processing 807 and file system check tool 809 "external" to the host devices 102 and storage arrays 106, it should be noted that one or more of such components may be implemented at least in part internal to one or more of the host devices 102 or storage arrays 106. By way of example, one or more of the fault database 801, fault analytics processing 803, fault report summary 805, recovery analysis processing 807 and file system check tool 809 may run as part of the recovery initiation module 112 running on the storage array 106-1 (or additional instances of the recovery initiation module that run on other ones of the storage arrays 106-2 through 106-M). One or more of the fault database 801, fault analytics processing 803, fault report summary 805, recovery analysis processing 807 and file system check tool 809 may also be implemented at least in part on storage controllers of the storage arrays 106 (e.g., storage controllers 110 on storage array 106-1), or on one or more of the host devices 102. The fault database 801, fault analytics processing 803, fault report summary 805, recovery analysis processing 807 and file system check tool 809 may also be implemented as part of a server that is external to the host devices 102 and storage arrays 106, or on cloud infrastructure (that is either external to the host devices 102 and storage arrays 106, or that also hosts one or more of the host devices 102 and storage arrays 106).

In some cases, it is desired to store only unique faults in the fault database 801. In such cases, it may be desired to keep a count of the number of times that a unique fault occurs, as this could impact performance. To ensure that a single entry is stored in the fault database 801 for correlated faults, a relative block address (RBA) universally unique identifier (UUID) may be included with each fault entry. The fault database 801, in some embodiments, is kept in-memory, and the contents thereof may be intermittently written to a persistent data store. The contents of the in-memory fault database 801 may be written to the persistent data store when reaching a certain size or age as designated by a storage administrator, service personnel or other authorized user.

Various examples of fault information that may be stored in the fault database 801 will now be described with respect to a logical address space that uses the structure shown in FIGS. 4A and 4B (e.g., with levels for root pages 401, top pages 403, mid pages 405, leaf pages 407, VLBs 409 and PLBs 411).

Figure 9A:

FIG. 9A shows a table 900 of entries in the fault database 801, where the table 900 includes columns for: a meta type and score; a fault reason and score; a fault scope; a family or snapshot group; and a volume. The meta type may correspond to the levels shown in FIGS. 4A and 4B. The table 900, for example, includes entries for different top pages 403 denoted TOP1 and TOP2, for one of the mid pages 405 denoted MID1, for one of the leaf pages 407 denoted LEAF1, and for one of the VLBs 409 denoted VLB1. The fault reason column indicates the type of fault encountered for the meta type. The fault reasons shown in table 900 include I/O errors (for TOP1 and MID1), validation errors (for TOP2 and LEAF1) and a checksum error (for VLB1).

The fault scope column includes various values (e.g., high, medium, low, unknown) which indicate the severity of a fault. For example, faults affecting the top pages 403 have a "high" fault scope, while faults affecting the mid pages 405 have a "medium" fault scope and faults affecting the leaf pages 407 have a "low" fault scope. This is intuitive in the context of the logical address structure of FIGS. 4A and 4B, as each of the top pages 403 represents 512 GB of logical address space, each of the mid pages 405 represents 1 GB of logical address space, and each of the leaf pages 407 represents 2 MB of logical address space (e.g., a fault affecting 512 GB of logical address space is likely to have a higher scope or impact than a fault affecting 1 GB of logical address space). Faults affecting the VLBs 409 and PLBs 411 may have an unknown fault scope, which is again intuitive in the context of the logical address structure of FIGS. 4A and 4B. A particular one of the VLBs 409, for example, may have virtual entries each associated with a reference count indicating the number of leaf pages 407 that point to a particular virtual block address, and those virtual entries map to physical block addresses in the PLBs 411. Because of this, a fault affecting one of the VLBs 409 or PLBs 411 may be associated with an unknown fault scope for simplicity. It should be appreciated, however, that by identifying reference counts in the virtual entries of the VLBs 409 and mapping such virtual entries to corresponding leaf pages 407, mid pages 409, etc., in the logical address structure of FIGS. 4A and 4B, it is possible to assign a different value as the fault scope for a particular fault affecting the VLBs 409 or PLBs 411.

The family and volume columns indicated the affected families or snapshot groups and storage volumes affected by each of the faults, when known or available. The VLBs 409, for instance, may not be associated with a particular snapshot group or family or a particular storage volume as the deduplication functionality described herein allows different snapshot groups or storage volumes to reference the same virtual entries in VLBs 409. Similarly, mid pages 405 and leaf pages 407 may be associated with snapshot groups or families, but not necessarily a particular storage volume.

The table 900 shows that there may be multiple entries for a given meta type and fault reason. For example, the table 900 includes two entries for I/O errors associated with TOP1. Also, although not shown in FIG. 9A, a table of fault information stored in fault database 901 may include entries for PLBs 411. Further, the particular values shown in table 900 (e.g., for fault reason, fault scope, etc.) are presented by way of example only. In other embodiments, various other types of fault reasons, fault scope, etc., may be associated with faults in addition to or in place of those shown in table 900.

Figure 9B:
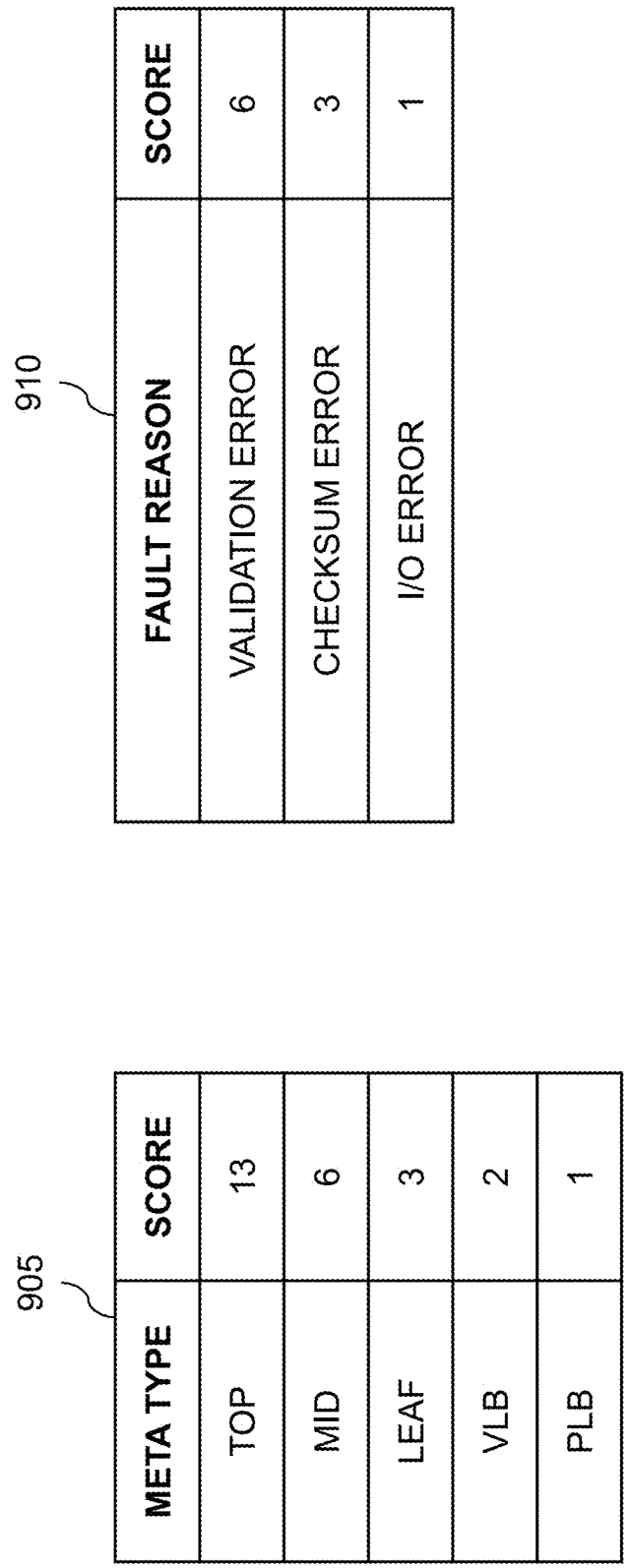

FIG. 9B shows tables 905 and 910 illustrating score assignments for meta types and fault reasons, respectively. The table 905 illustrates score assignments for the meta types corresponding to top pages 403, mid pages 405, leaf pages 407, VLBs 409 and PLBs 411 in descending order. As noted above, this corresponds to the resulting fault scope, in that a top page fault affects a larger portion of the logical address space than a mid page fault, which affects a larger portion of the logical address space than a leaf page fault, etc. The table 910 illustrates how different types of faults or fault reasons are assigned different scores. In this example, validation errors are assigned the highest score, followed by checksum errors, followed by I/O errors. It should be noted that the particular scores assigned to the meta types and fault reasons in table 905 and 910 are presented by way of example, and that other scores may be used in other embodiments. Further, the ordering of scores may vary. As an example, in some embodiments a checksum error may be assigned a higher score than a validation error, or checksum and validation errors may be assigned the same score, etc.

FIG. 9C shows table 915 illustrating an example of summary information (e.g., fault report summary 805) generated by the fault analytics processing 803 or FAT based on the information stored in the fault database 801 in tables 900, 905 and 910 described above. The table 915 includes various fault summary parameters and corresponding values. The fault summary parameters illustratively include: a number of unique faults; a number of volumes impacted; a number of families or snapshot groups impacted; a total amount of unavailable data or total data unavailable (TDU); an amount of unavailable data per-volume or data unavailable per volume (DUV), which includes values for each volume (e.g., volumes V1000 and V2000 in the FIG. 9C example); data unavailable per-family (DUF); total space unavailable (TSU); total data recoverable (TDR); data recoverable per-family (DRF); an average fault meta type score (e.g., between a minimum of 1 and maximum of 13 as per table 905); a standard deviation of the fault meta type score; an average fault reason score (e.g., between a minimum of 1 and maximum of 6 as per table 910); and a standard deviation of the fault reason score. It should be appreciated that the particular fault parameters and associated values illustrated in table 915 are presented by way of example only. Fault summary information or fault report summary 805, in other embodiments, may include only a subset of the fault parameters shown in table 915, or may include one or more other fault parameters in addition to or in place of one or more of the fault parameters shown in table 915.

Figure 9D:

FIG. 9D shows a table 920 illustrating additional examples of summary information (e.g., fault report summary 805) generated by the fault analytics processing 803 or FAT based on the information stored in the fault database 801 in tables 900, 905 and 910 described above. More particularly, table 920 includes fault store summary parameters for fault type frequency distribution and fault reason frequency distribution. The fault type frequency distribution parameter indicates the number of faults encountered for different meta types (e.g., entries in the table 900, which include 3 for top pages, 1 for a middle, page, 1 for a leaf page, and 1 for a VLB). The fault reason frequency distribution indicates the number of faults encountered for different fault reasons (e.g., entries in the table 900, which include 3 for I/O errors, 1 for a checksum error, and 1 for a validation error).

In some embodiments, the fault report summary 805 is based on combinations of multiple ones of the above-described fault summary parameters in tables 915 and 920. By using multiple different fault summary parameters rather than any single fault summary parameter, a more accurate view of faults and a better recommendation on whether to run recovery may be provided. In some cases, for example, individual fault summary parameters may be misleading. For example, the number of volumes impacted fault summary parameter may not always be accurate as volume information may not be available (e.g., such as for faults affecting VLBs 409 as illustrated in table 900). In addition, the TDU fault summary parameter may in some cases be inaccurate, but may be improved by looking at the contents of the top pages 403, mid pages 405, leaf pages 407 and VLBs 409 to get more useful information. The DUV fault summary parameter may not be accurate in some cases, such as for faults occurring at the mid pages 405 or leaf pages 407 level. The TDR fault summary parameter may rely on being able to fix and repair top pages 403 and mid pages 405 from back pointer and copy-parent and copy-children relationships, and being able to fix and repair leaf pages 407 based on copy-parent and copy-children relationships. In some cases, volume, family or other information is not available at the point of fault detection, and thus may fail to be captured in alerts provided to the fault database 801.

Figure 10:
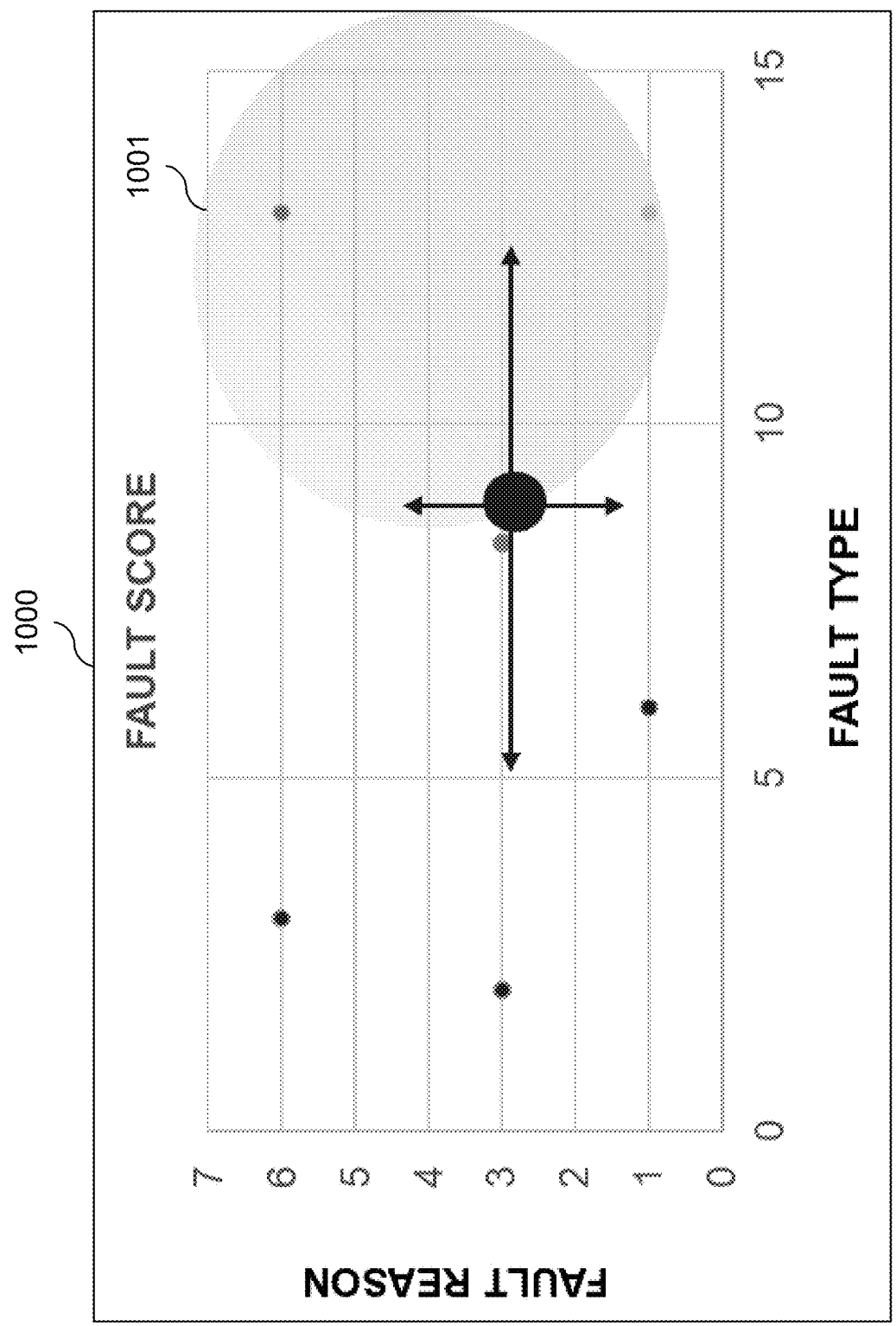
FIG. 10 illustrates a fault distribution utilized for determining when to initiate recovery of a storage system in an illustrative embodiment.

In some embodiments, the information in the fault database 801 (e.g., information from tables 900, 905, 910, 915 and 920) may be used to generate one or more visualizations that are included as part of the fault report summary 805. FIG. 10, for example, illustrates a fault distribution plot 1000. The fault distribution plot 1000 shows the entries from table 900 for fault reason score and fault type score with small circular dots, and shows the average fault reason score and fault type score and associated standard deviations with the large circular dot and arrows extending therefrom. The fault distribution plot 1000 also shows a large transparent grey circle 1001 that represents the radius or threshold of fault scores that will result in recommending recovery (e.g., recovery is recommended when the large circular dot representing the average fault reason score and fault type score falls within the large transparent grey circle 1001). This is one way of providing a binary answer as to whether to run the recovery process. In other embodiments, however, different techniques may be used. For example, a decision tree where thresholds are defined for different fault summary parameters may be used to determine when to recommend running recovery. Further, various other types of visualizations of the fault report summary 805 may be used in addition to or in place of the plot 1000 shown in FIG. 10. For example, various pie charts may be used to display various fault summary parameters (e.g., to display information regarding the amounts of data or logical address space made unavailable as a result of the faults in fault database 801 as a proportion of the total amount of data or logical address space, the amounts of data potentially recoverable as a portion of the total amount of data made unavailable as a result of the faults in fault database 801, etc.), line or bar charts characterizing various fault summary parameters, heat maps characterizing numbers of faults affecting different snapshot groups or storage volumes, etc.

Figure 11:
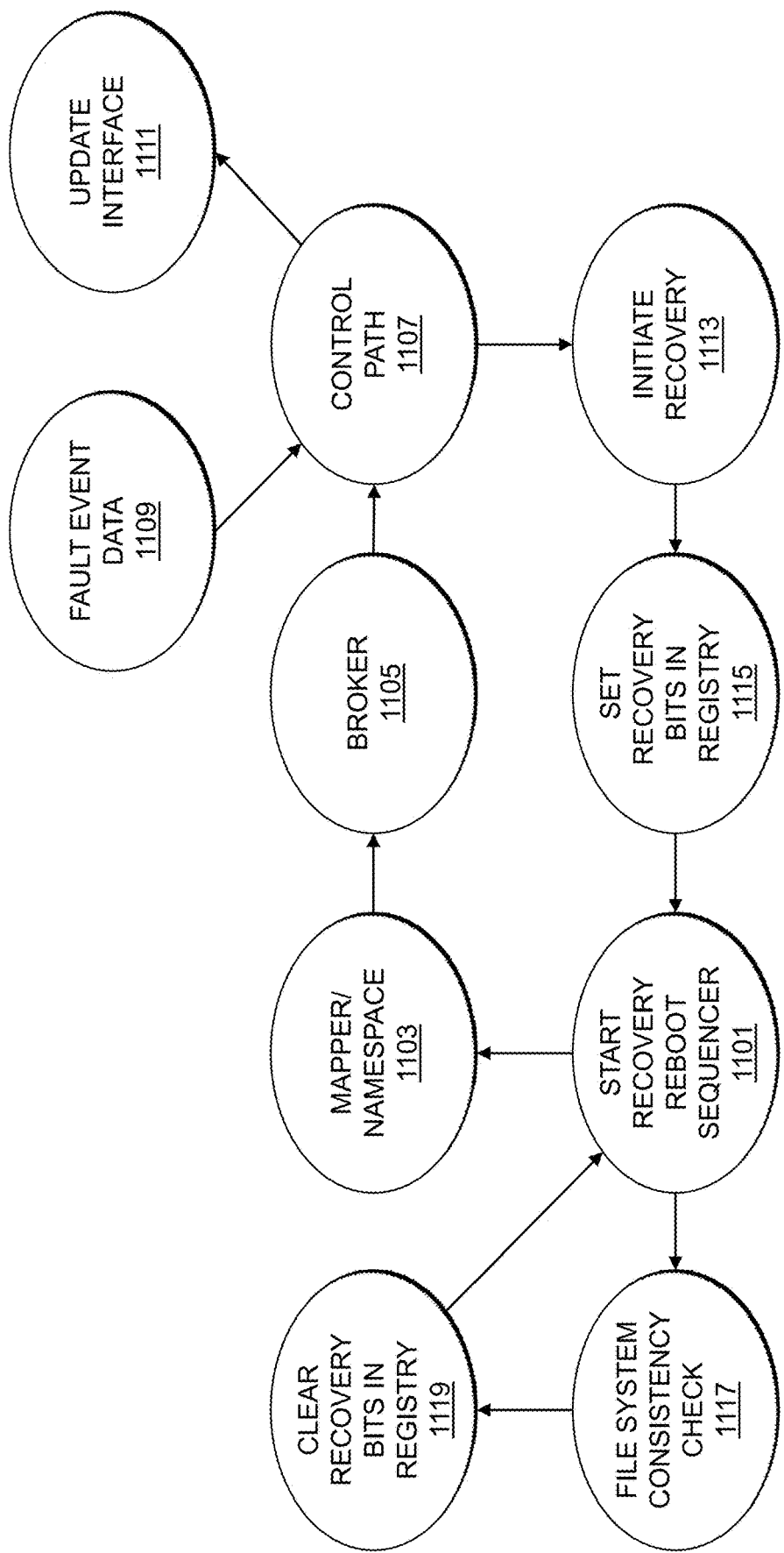
FIG. 11 shows a recovery lifecycle for a storage system in an illustrative embodiment.

FIG. 11 shows a recovery lifecycle for a storage system (e.g., a storage array or arrays that utilizes the data path architecture 307). The recovery lifecycle illustrates various states, including a start recovery reboot sequence state 1101, which may transition to the mapper/namespace layers of the mapper module 315 and namespace module 313 of the data path architecture 307 in state 1103. The mapper module 315 and namespace module 313 may invoke the broker module 309 in state 1105. The broker module 309 utilizes control path in state 1107. Fault event data is provided to the control path in state 1109.

The control path may update an interface (e.g., a graphical user interface (GUI)) utilized by a storage administrator, service personnel or other authorized user in state 1111. The storage administrator, service personnel or other authorized user may utilize the control path to view fault information stored in the fault database 801 and determine whether to initiate recovery in state 1113. The control path may also automatically enter the initiate recovery state 1113 without manual input if desired. For example, depending on the contents of the fault report summary 805, the control path may decide to query a user to determine whether to run recovery or make the determination automatically. If the fault report summary 805 includes a fault score above some designated threshold, as an example, the control path may automatically enter the initiate recovery state 1113. Otherwise, the control path 1107 may seek input from the user prior to entering the initiate recovery state.

After initiating recovery, recovery bits are set in a registry in state 1115. The recovery reboot sequencer is then started in state 1101. The state 1101 moves to the file system consistency check in state 1117. After the file system consistency check is completed, the recovery bits in the registry are cleared in state 1119. The lifecycle then returns to state 1101.

Generation of a fault alert for storage in the fault database 801 may utilize a fault alerting application programming interface (API), which uses a command:

FaultAlert(IoRequest*, cyc_fault_action_t action, cyc_fault_info_t*info)

where action denotes a remedy of fault or a recommendation to fix the fault, and info denotes information such as fault reason, fault scope, a volume identifier, family identifier, logical and physical page address and sizes describing the fault, etc. The info along with the action and a timestamp are stored in the fault database 801. Such information helps to make a more informed decision on scheduling recovery. In the above command, info includes information such as cyc_metadata_type_t denoting a meta type, cyc_fault_reason_t denoting a fault reason, and cyc_fault_scope_t denoting a fault scope. The volume identifier (VolumeId), family identifier (FamilyId), logical page address range size (LogicalSize) and physical page address range size (PhysicalSize) in info may comprise unsigned integer type 32-bit values (uint32_t). The logical page address (LogicalPageAddr) and physical page address (PhysicalPageAddr) in info may comprise unsigned integer type 64-bit values (uint64_t).

The fault alerting API may use various reason codes in cyc_fault_reason_t, including: LOG_NO_PROGRESS indicating that a flush is not able to de-stage data from a data log or metadata from a metadata log; METALOG_IO_ERROR indicating a PD/PB (LogPageDescriptor/LogPageBuffer) read/write error; METADATA_IO_ERROR indicating a R/T/M/L/V (root page/top page/mid page/leaf page/VLB) read/write error during flush, which would fail to move the data log tail, and also covers read/write error during background operations such as delete, garbage collection, merge bin, etc.; METADATA_RESOURCE_ERROR indicating a PageBin read/write error during flush which would fail to move the data log tail, and also includes read/write error during background operation like delete, garbage collection, physical utilization counter update etc.; METADATA_VALIDATION_ERROR indicating a consistency error which may include inconsistency of deduplication reference count, copy count, etc.; METADATA_CHECKSUM_ERROR indicating an error associated with computing a metadata checksum; DATALOG_IO_ERROR indicating a PD/PB read/write error; DATA_IO_ERROR indicating a PLB read/write error; DATA_RESOURCE_ERROR indicating a P/U/S (PLBDesc/UberPageDesc/UberSummaryPage) read/write error during flush which would fail to move the data log tail, and also includes read/write error during background operations such as delete, garbage collection, physical utilization counter update, etc.; DATA_CHECKSUM_ERROR indicating an error associated with computing a data checksum; SYSTEM_OUT_OF_MEMORY (OOM) indicating a memory leak after several retry attempts to flush; etc.

The fault alerting API may use various reason codes in cyc_fault_scope_t, including: DATA_LOSS_NONE indicating a memory leak; DATA_LOSS_UNKNOWN indicating a VLB failure; DATA_LOSS_LOW indicating a leaf page failure; DATA_LOSS_MEDIUM indicating a mid page or PLBDesc failure; DATA_LOSS_HIGH indicating a top page failure; SPACE_LOSS_NONE; SPACE_LOSS_UNKNOWN indicating a free PageBin or PageList failure; SPACE_LOSS_LOW; indicating a PageList merge; SPACE_LOSS_MEDIUM indicating failure of a PageBin merge; SPACE_LOSS_HIGH indicating failure of a PageBin/PageList trash; etc.

In some embodiments, a fault scoring approach is utilized where a scoreboard is built from entries in the fault database 801. A priority score (e.g., metaTypeScore) is assigned to each meta type. The priority score may be assigned based on the hierarchy of data structures (e.g., top pages 403 are assigned a higher score than mid pages 405, mid pages are assigned a higher score than leaf pages 407, etc., an UberSummary is assigned a higher score than a PLBDesc, etc.). A critical score (faultReasonScore) is assigned to each fault reason code (e.g., METADATA_IO_ERROR is deemed less critical and has lower score than METADATA_VALIDATION_ERROR or METADATA_CHECKSUM_ERROR, where METADATA_VALIDATION_ERROR is an indication of a software bug and METADATA_CHECKSUM_ERROR is an indication of memory corruption, etc.). The records in the fault database 801 may be sorted (e.g., based on fault score), and then based on the frequency of each unique record, a weight (faultWeight) is assigned to each meta type (e.g., where a higher weight means it has impacted more I/O requests).

The averages of the metaTypeScore and faultReasonScore are then computed as follows:

$$avgMetaScore = \Sigma faultWeight * metaTypeScore / numFaults$$

$$avgReasonScore = \Sigma faultWeight * faultReasonScore / numFaults$$

where numFaults denotes the number of faults. The standard deviation of metaTypeScore and faultReasonScore may also be computed, which give information regarding the spread or distribution of faults. In some embodiments, if the average score is high and the standard deviation is low, then recovery is recommended. A range of avgFaultScore and associated standard deviation may also be used to recommend running recovery with different degrees of urgency.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for generating recommendations for initiating recovery of a fault domain representing at least a portion of a logical address space of a storage system will now be described in greater detail with reference to FIGS. 12 and 13. Although described in the context of system 100, these platforms may also be used to implement at least portions of other information processing systems in other embodiments.

Figure 12:
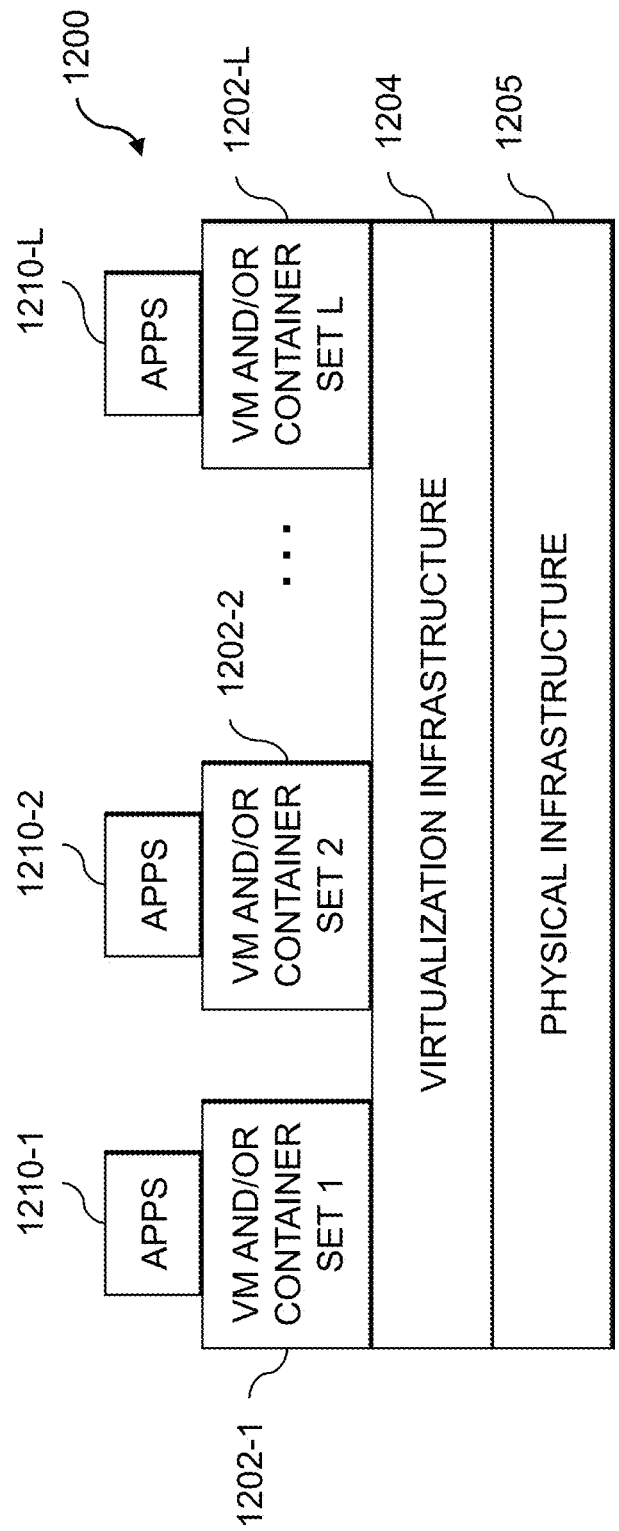
FIGS. 12 and 13 show examples of processing platforms that may be utilized to implement at least a portion of an information processing system in illustrative embodiments.
Figure 13:
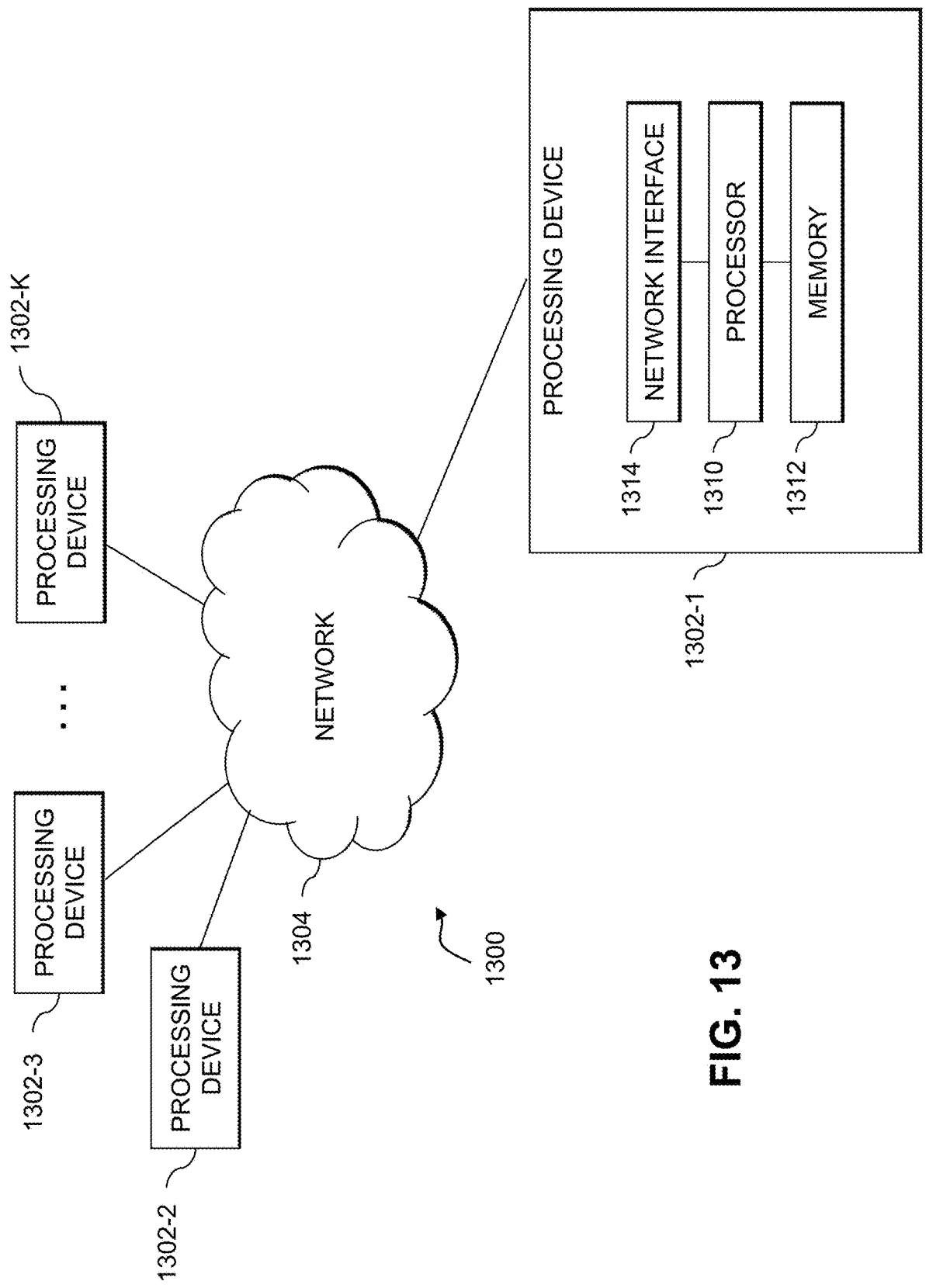

FIG. 12 shows an example processing platform comprising cloud infrastructure 1200. The cloud infrastructure 1200 comprises a combination of physical and virtual processing resources that may be utilized to implement at least a portion of the information processing system 100 in FIG. 1. The cloud infrastructure 1200 comprises multiple virtual machines (VMs) and/or container sets 1202-1, 1202-2, . . . 1202-L implemented using virtualization infrastructure 1204. The virtualization infrastructure 1304 runs on physical infrastructure 1205, and illustratively comprises one or more hypervisors and/or operating system level virtualization infrastructure. The operating system level virtualization infrastructure illustratively comprises kernel control groups of a Linux operating system or other type of operating system.

The cloud infrastructure 1200 further comprises sets of applications 1210-1, 1210-2, . . . 1210-L running on respective ones of the VMs/container sets 1202-1, 1202-2, . . . 1202-L under the control of the virtualization infrastructure 1204. The VMs/container sets 1202 may comprise respective VMs, respective sets of one or more containers, or respective sets of one or more containers running in VMs.

In some implementations of the FIG. 12 embodiment, the VMs/container sets 1202 comprise respective VMs implemented using virtualization infrastructure 1204 that comprises at least one hypervisor. A hypervisor platform may be used to implement a hypervisor within the virtualization infrastructure 1204, where the hypervisor platform has an associated virtual infrastructure management system. The underlying physical machines may comprise one or more distributed processing platforms that include one or more storage systems.

In other implementations of the FIG. 12 embodiment, the VMs/container sets 1202 comprise respective containers implemented using virtualization infrastructure 1204 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1200 shown in FIG. 12 may represent at least a portion of one processing platform. Another example of such a processing platform is processing platform 1300 shown in FIG. 13.

The processing platform 1300 in this embodiment comprises a portion of system 100 and includes a plurality of processing devices, denoted 1302-1, 1302-2, 1302-3, . . . 1302-K, which communicate with one another over a network 1304.

The network 1304 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1302-1 in the processing platform 1300 comprises a processor 1310 coupled to a memory 1312.

The processor 1310 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1312 may comprise random access memory (RAM), read-only memory (ROM), flash memory or other types of memory, in any combination. The memory 1312 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1302-1 is network interface circuitry 1314, which is used to interface the processing device with the network 1304 and other system components, and may comprise conventional transceivers.

The other processing devices 1302 of the processing platform 1300 are assumed to be configured in a manner similar to that shown for processing device 1302-1 in the figure.

Again, the particular processing platform 1300 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for generating recommendations for initiating recovery of a fault domain representing at least a portion of a logical address space of a storage system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, storage systems, storage devices, fault types, recovery tools, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processing device comprising a processor coupled to a memory;
   the at least one processing device being configured to perform steps of:
   identifying a plurality of faults associated with at least a portion of a logical address space in a fault domain of a storage system, the plurality of faults specifying (i) fault reason codes and (ii) metadata types for logical pages in the logical address space associated with the plurality of faults;
   determining a fault summary characterizing impact of the plurality of faults in the fault domain of the storage system, the fault summary being based at least in part on aggregating fault scores assigned to the fault reason codes and the metadata types specified in the plurality of faults;
   generating a recommendation on whether to initiate recovery of the fault domain of the storage system based at least in part on the fault summary; and
   initiating recovery of the fault domain of the storage system based at least in part on the generated recommendation.

2. The apparatus of claim 1 wherein the fault domain comprises all of the logical address space of the storage system.

3. The apparatus of claim 1 wherein the logical address space is organized as a B-tree comprising a plurality of levels, the plurality of levels comprising a leaf logical page level comprising a plurality of leaf pages and one or more additional logical page levels above the leaf logical page level.

4. The apparatus of claim 3 wherein a fault score assigned to a metadata type for the leaf logical page level is lower than a fault score assigned to metadata types for the one or more additional logical page levels above the leaf page logical level.

5. The apparatus of claim 3 wherein the plurality of leaf pages in the leaf logical page level comprise pointers to virtual block addresses associated with entries in a plurality of virtual blocks in a virtual block level of the logical address space, wherein the virtual block addresses comprise pointers to physical block addresses in a plurality of physical blocks in a physical block level of the logical address space, wherein a fault score assigned to a metadata type for the virtual block level is lower than a fault score assigned to a metadata type for the leaf logical page level, and wherein a fault score assigned to a metadata type for the physical block level is lower than a fault score assigned to the metadata type for the virtual block level.

6. The apparatus of claim 3 wherein the one or more additional logical page levels comprise:
   a middle page level comprising a plurality of middle pages associated with respective subsets of the plurality of leaf pages in the leaf page level; and
   a top page level comprising one or more top pages associated with respective subsets of the plurality of middle pages in the middle page level.

7. The apparatus of claim 6 wherein a given one of the one or more top pages represents an n*m sized portion of the logical address space that references n of the plurality of middle pages in the middle page level, a given one of the n middle pages represents an m sized portion of the logical address space and references n of the plurality of leaf pages in the leaf page level, and a given one of the n leaf pages represents an m/n sized portion of the logical address space.

8. The apparatus of claim 7 wherein n is 512 and m is one gigabyte.

9. The apparatus of claim 1 wherein a given one of the plurality of faults specifies:
   a given metadata type for a given logical page in the logical address space that is a source of the given fault;
   a given fault reason code;
   a given fault scope characterizing at least one of potential data loss and potential logical address space loss in the storage system resulting from the given fault;
   a given snapshot group associated with the given logical page; and
   one or more storage volumes associated with the given logical page.

10. The apparatus of claim 1 wherein the fault summary comprises a set of fault summary parameters for the plurality of faults, the set of fault summary parameters comprising:
    at least one of a number of unique faults in the plurality of faults, a number of storage volumes impacted by the plurality of faults, and a number of snapshot groups impacted by the plurality of faults;
    at least one of a total amount of data made unavailable in the storage system as a result of the plurality of faults, a total amount of logical address space made unavailable as a result of the plurality of faults, per-storage volume amounts of data made unavailable in the storage system as a result of the plurality of faults, and per-snapshot group amounts of data made unavailable in the storage system as a result of the plurality of faults; and
    at least one of a total amount of recoverable data in the storage system, per-storage volume amounts of recoverable data in the storage system, and per-snapshot group amounts of recoverable data in the storage system.

11. The apparatus of claim 1 wherein the fault summary comprises a set of fault summary parameters for the plurality of faults, the set of fault summary parameters comprising:
    an average fault score for the metadata types specified in the plurality of faults;
    a standard deviation of the average fault score for the metadata types specified in the plurality of faults;
    an average fault score for the fault reason codes specified in the plurality of faults; and
    a standard deviation of the average fault score for the fault reason codes specified in the plurality of faults.

12. The apparatus of claim 11 wherein the fault summary comprises at least one visualization of the set of fault summary parameters, the at least one visualization comprising a plot comprising:
    data points for each of at least a subset of the plurality of faults, a given data point for a given fault representing the fault score for the metadata type specified in the given fault on a first axis and the fault score for the fault reason code specified in the given fault on a second axis;
    an additional data point representing the average fault score for the metadata types specified in the plurality of faults on the first axis and the average fault score for the fault reason codes specified in the plurality of faults on the second axis;
    a first visual indicator of the standard deviation of the average fault score for the metadata types specified in the plurality of faults extending from the additional data point along the first axis;
    a second visual indicator of the standard deviation of the average fault score for the fault reason codes specified in the plurality of faults extending from the additional data point along the second axis; and
    a third visual indicator representing a radius of fault scores in the first axis and the second axis that result in generating a recommendation to initiate the recovery of the fault domain of the storage system.

13. The apparatus of claim 11 wherein generating the recommendation on whether to initiate the recovery of the fault domain of the storage system comprises generating a recommendation to initiate the recovery responsive to at least one of:
    the average fault score for the metadata types specified in the plurality of faults being above a first designated threshold and the standard deviation of the average fault score for the metadata types specified in the plurality of faults being below a second designated threshold; and
    the average fault score for the fault reason codes specified in the plurality of faults being above a third designated threshold and the standard deviation of the average fault score for the fault reason codes specified in the plurality of faults being below a fourth designated threshold.

14. The apparatus of claim 1 wherein the fault summary comprises a set of fault summary parameters for the plurality of faults, the set of fault summary parameters comprising:

a frequency distribution of fault scores for the metadata types specified in the plurality of faults; and
a frequency distribution of fault scores for the fault reason codes specified in the plurality of faults.

15. A computer program product comprising a non-transitory processor-readable storage medium having stored therein program code of one or more software programs, wherein the program code when executed by at least one processing device causes the at least one processing device to perform steps of:
identifying a plurality of faults associated with at least a portion of a logical address space in a fault domain of a storage system, the plurality of faults specifying (i) fault reason codes and (ii) metadata types for logical pages in the logical address space associated with the plurality of faults;
determining a fault summary characterizing impact of the plurality of faults in the fault domain of the storage system, the fault summary being based at least in part on aggregating fault scores assigned to the fault reason codes and the metadata types specified in the plurality of faults;
generating a recommendation on whether to initiate recovery of the fault domain of the storage system based at least in part on the fault summary; and
initiating recovery of the fault domain of the storage system based at least in part on the generated recommendation.

16. The computer program product of claim 15 wherein the fault summary comprises a set of fault summary parameters for the plurality of faults, the set of fault summary parameters comprising:
an average fault score for the metadata types specified in the plurality of faults;
a standard deviation of the average fault score for the metadata types specified in the plurality of faults;
an average fault score for the fault reason codes specified in the plurality of faults; and
a standard deviation of the average fault score for the fault reason codes specified in the plurality of faults.

17. The computer program product of claim 16 wherein the fault summary comprises at least one visualization of the set of fault summary parameters, the at least one visualization comprising a plot comprising:
data points for each of at least a subset of the plurality of faults, a given data point for a given fault representing the fault score for the metadata type specified in the given fault on a first axis and the fault score for the fault reason code specified in the given fault on a second axis;
an additional data point representing the average fault score for the metadata types specified in the plurality of faults on the first axis and the average fault score for the fault reason codes specified in the plurality of faults on the second axis;
a first visual indicator of the standard deviation of the average fault score for the metadata types specified in the plurality of faults extending from the additional data point along the first axis;
a second visual indicator of the standard deviation of the average fault score for the fault reason codes specified in the plurality of faults extending from the additional data point along the second axis; and
a third visual indicator representing a radius of fault scores in the first axis and the second axis that result in generating a recommendation to initiate the recovery of the fault domain of the storage system.

18. A method comprising steps of:
identifying a plurality of faults associated with at least a portion of a logical address space in a fault domain of a storage system, the plurality of faults specifying (i) fault reason codes and (ii) metadata types for logical pages in the logical address space associated with the plurality of faults;
determining a fault summary characterizing impact of the plurality of faults in the fault domain of the storage system, the fault summary being based at least in part on aggregating fault scores assigned to the fault reason codes and the metadata types specified in the plurality of faults;
generating a recommendation on whether to initiate recovery of the fault domain of the storage system based at least in part on the fault summary; and
initiating recovery of the fault domain of the storage system based at least in part on the generated recommendation;
wherein the method is performed by at least one processing device comprising a processor coupled to a memory.

19. The method of claim 18 wherein the fault summary comprises a set of fault summary parameters for the plurality of faults, the set of fault summary parameters comprising:
an average fault score for the metadata types specified in the plurality of faults;
a standard deviation of the average fault score for the metadata types specified in the plurality of faults;
an average fault score for the fault reason codes specified in the plurality of faults; and
a standard deviation of the average fault score for the fault reason codes specified in the plurality of faults.

20. The method of claim 19 wherein the fault summary comprises at least one visualization of the set of fault summary parameters, the at least one visualization comprising a plot comprising:
data points for each of at least a subset of the plurality of faults, a given data point for a given fault representing the fault score for the metadata type specified in the given fault on a first axis and the fault score for the fault reason code specified in the given fault on a second axis;
an additional data point representing the average fault score for the metadata types specified in the plurality of faults on the first axis and the average fault score for the fault reason codes specified in the plurality of faults on the second axis;
a first visual indicator of the standard deviation of the average fault score for the metadata types specified in the plurality of faults extending from the additional data point along the first axis;
a second visual indicator of the standard deviation of the average fault score for the fault reason codes specified in the plurality of faults extending from the additional data point along the second axis; and
a third visual indicator representing a radius of fault scores in the first axis and the second axis that result in generating a recommendation to initiate the recovery of the fault domain of the storage system.

* * * * *